United States Patent
Shimokawa et al.

(10) Patent No.: US 7,227,120 B2
(45) Date of Patent: Jun. 5, 2007

(54) AREA MONITORING MULTI-BEAM PHOTOELECTRIC SENSOR

(75) Inventors: Satoru Shimokawa, Ohtsu (JP); Tetsuya Akagi, Fukuchiyama (JP); Takayoshi Takahara, Kameoka (JP); Yasushi Miyake, Fukuchiyama (JP); Toshinori Sato, Fukuchiyama (JP); Shunsuke Ito, Fukuchiyama (JP)

(73) Assignee: Omron Corporation, Kyoto-shi (JP)

( * ) Notice: Subject to any disclaimer, the term of this patent is extended or adjusted under 35 U.S.C. 154(b) by 94 days.

(21) Appl. No.: 11/236,862

(22) Filed: Sep. 28, 2005

(65) Prior Publication Data

US 2006/0065818 A1   Mar. 30, 2006

(30) Foreign Application Priority Data

Sep. 30, 2004  (JP) .............................. 2004-289407
Sep. 30, 2004  (JP) .............................. 2004-289419

(51) Int. Cl.
*G01J 1/44*  (2006.01)
*H01J 40/14*  (2006.01)
*H03F 3/08*  (2006.01)
*G06M 7/00*  (2006.01)

(52) U.S. Cl. .................. 250/214 R; 250/221; 250/239; 327/514; 340/555

(58) Field of Classification Search ............ 250/214 R, 250/221, 222.1, 239; 327/514; 340/507, 340/516, 555

See application file for complete search history.

(56) References Cited

U.S. PATENT DOCUMENTS 6,504,140 B1 *  1/2003  Ueno et al. ............. 250/214 R

FOREIGN PATENT DOCUMENTS

| JP | 04-213915 | 8/1992 |
| JP | 08-148981 | 6/1996 |
| JP | 2002-124170 | 4/2002 |

* cited by examiner

*Primary Examiner*—Georgia Epps
*Assistant Examiner*—Patrick J. Lee
(74) *Attorney, Agent, or Firm*—Foley & Lardner LLP

(57) ABSTRACT

A multi-beam photoelectric sensor is disclosed which can be fabricated by selecting the length of a light projection/light-receiving columnar member and the number and pitches of optical axes in accordance with the width of a hazardous area of an object or the diameter of the minimum object to be detected. A projector string or a photo-detector string includes an optical module string having an alignment of a plurality of optical modules with an optical system for one optical axis, a light projection circuit for one optical axis and a plurality of flip-flops corresponding to one stage of a shift register, integrated with each other, and a flat cable. The flip-flops in the adjacent optical modules are connected in cascade by the adjacent module conduction wires thereby to make up a shift register. The optical modules making the optical module string are sequentially activated by the data sequentially sent by the shift register.

13 Claims, 26 Drawing Sheets

A  Lead frame mount type

B  Board mount type

A  Back perspective view

B  Enlarged view of portion A

A  Front plate structure

B  Matching structure of front plate
   and columnar case

A  Shield piece configuration

B  Dummy module configuration

AREA MONITORING MULTI-BEAM PHOTOELECTRIC SENSOR

BACKGROUND OF THE INVENTION

1. Field of the Invention

This invention relates to a multi-beam photoelectric sensor used for monitoring a person intruding into a hazardous area, or in particular to a multi-beam photoelectric sensor in which the length of the light projection and receiving columnar members, the number and the pitches of the optical axes can be changed in versatile fashion in accordance with the width of the hazardous area to be monitored or the minimum diameter of an object detected.

2. Description of the Related Art

The multi-beam photoelectric sensor of this type, as well known, comprises at least a light projection columnar member having a columnar case for accommodating a light projection string and at least a light-receiving columnar member having a columnar case for accommodating a photo-detector string, wherein the light projection and light-receiving columnar members are arranged with the light projection and light-receiving surfaces thereof in appropriately spaced and opposed relation to each other thereby to form an object-detecting light curtain between the light projection and light-receiving columnar members.

In the prior art, the light projector string and the photo-detector string accommodated in the columnar case is generally configured of a combination of the multi-beam optical modules having a unit number of optical axes (say, 4, 8 or 16 optical axes). In this multi-beam optical module, as many optical elements as the unit number of the optical axes (the light-emitting elements and the light projection lenses for the light projector, and the light-receiving elements and the light-receiving lenses for the photo-detector) are held integrally by a resin holder having a fixed pitch of optical axes.

In this conventional multi-beam photoelectric sensor, however, the length of the light projection and light-receiving columnar members and the number and the pitches of the optical axes are determined by a combination of the multi-beam optical modules having the fixed number and the fixed pitches of optical axes. It is therefore not easy to change the length of the light projection/light-receiving columnar member or the number and the pitches of optical axes in versatile way in accordance with the width of the hazardous area or the minimum diameter of the object to be detected.

In view of this, the present applicant has earlier proposed a novel multi-beam photoelectric sensor in which the light projector string and the photo-detector string accommodated in the columnar case are configured of a mass of single-beam optical modules (see Japanese Unexamined Patent Publication No. 2002-124170).

This novel multi-beam photoelectric sensor, in which the light projector string and the photo-detector string accommodated in the columnar case are configured of a mass of single-beam optical modules, can be fabricated by selecting the length of the light projection/light-receiving columnar member for each unit of optical axis. Thus, a light curtain most suitable for the width of a hazardous area to be monitored can be advantageously generated.

In the aforementioned multi-beam photoelectric sensor proposed earlier by the present applicant, the optical parts making up the projection optical system or the light-receiving optical system are accommodated in each module, and as compared with the other conventional light curtains, a light curtain having the number of optical axes most suitable for the width of the hazardous area to be monitored can be easily generated. With regard to the electrical parts such as the light projection circuit and the light-receiving circuit corresponding to each module, however, the circuit boards corresponding to a plurality of different optical modules are prepared and combined to meet the requirement of an arbitrary number of optical modules. Thus, it is necessary to hold a plurality of types of circuit boards in stock. As far as the circuit boards are concerned, therefore, the number of the parts of the circuit board in stock cannot be reduced to less than a predetermined amount.

SUMMARY OF THE INVENTION

The object of this invention is to provide a multi-beam photoelectric sensor in which the same electrical parts used for each optical axis are modularized for each optical axis, thereby making it possible to reduce the number of types of circuit boards prepared to generate the light curtain of the number of optical axes most suitable to the width of a hazardous area to be monitored.

The above and other objects, features and advantages of the invention will be easily understood by those skilled in the art by referring to the following description of the specification.

According to this invention, there is provided a multi-beam photoelectric sensor comprising at least a light projection columnar member including a columnar case for accommodating a light projector string and at least a light-receiving columnar member having a columnar case for accommodating a photo-detector string, wherein the light projection columnar member and the light-receiving columnar member are arranged with the light projection surfaces and the light receiving surfaces thereof in appropriately spaced relationship with each other thereby to generate a light curtain between the light projection columnar member and the light-receiving columnar member for detecting an object.

This multi-beam photoelectric sensor comprises a light projector string constituting a light projection module string including a plurality of aligned light projection modules having an integration of a light projection optical system for one optical axis, a light projection circuit for one optical axis and flip-flops corresponding to one stage of shift register, and an optical signal transmission member including a common conduction wire for uniformly connecting from a light projection module located at an end of the light projection module string to the light projection module located at the other end thereof and an adjacent module connection wire for connecting only the adjacent light projection modules, wherein each light projection module making up the light projection module string is electrically connected to the light projection signal transmission member.

This multi-beam photoelectric sensor comprises a photo-detector string constituting a light-receiving module string including a plurality of aligned light-receiving modules having an integration of a light-receiving optical system for one optical axis, a light-receiving circuit for one optical axis and flip-flops corresponding to one stage of shift register, and an optical signal transmission member including a common conduction wire for uniformly connecting from a light-receiving module located at an end of the light-receiving module string to the light-receiving module located at the other end thereof and an adjacent module connection wire for connecting only the adjacent light-receiving-modules, wherein each light-receiving module making up the light-receiving module string is electrically connected to the light-receiving signal transmission member.

Further, the flip-flops in the adjacent light projection modules are connected in cascade to each other by the adjacent module connection wire thereby to make up a shift register and so are the flip-flops in the adjacent light-receiving modules.

In response to the data sequentially sent by the shift register, each light projection module making up the light projection module string and each light-receiving module making up the light-receiving module string are sequentially operated.

With this configuration, the light projection module and the light-receiving module each accommodate not only an optical system (the light projection optical system or the light-receiving optical system) for one optical axis but also flip-flops corresponding to one stage of the shift register and the electrical circuit (the light projection circuit or the light-receiving circuit) for one optical axis. The flip-flops in the adjacent light projection modules and the flip-flops in the adjacent light-receiving modules are respectively connected in cascade by the adjacent module connection wires thereby to make up a shift register. Based on the presence or absence of a bit in the shift registers, the optical axis is selectively validated and a plurality of optical axes of the light curtain are sequentially activated. Thus, the desired number of single-beam modules (the light projection modules or the light-receiving modules) are repeatedly arranged at the desired intervals, and connected to each conduction wire (the common conduction wire and the adjacent module connection wire) of the signal transmission member (the light projection signal transmission member or the light-receiving signal transmission member). Regardless of the number of optical axes, therefore, the light curtain can be fabricated by concentrating at least the required parts used for each optical axis in the light projection module and the light-receiving module. Specifically, the number of part types can be reduced. A stock of different circuit boards corresponding to the number of a plurality of types of optical axes is not of course required. Further, with regard to the types of members not used repeatedly for each optical axis, the signal transmission member is cut to an appropriate length, while the columnar case, the light projection columnar member and the light-receiving columnar member are cut to an appropriate length using a member (an extrusion forming member, for example) to secure the same shape of the section perpendicular to the length of the column at any longitudinal position of the column or a cyclic member along the direction of column length. In this way, the number of types of parts can be reduced to minimum.

Also, the signal transmission member may be an integration of the common conduction wire and the adjacent module conduction wire while maintaining the insulation from each other.

With this configuration, the job is facilitated to electrically connect the light projection signal transmission member with the light projection module or the light-receiving signal transmission member with the light-receiving module. Especially, the adjacent module connection wire, if not integrated, is only a plurality of separate short wires, and therefore numerical control or the job to handle is bothersome. If integrated, on the other hand, they can be easily handled as one substantial signal transmission member, and the number of wires can also be positively, easily grasped according to the length of the signal transmission member.

At the same time, the light projection signal transmission member may be a flat cable having a plurality of core wires, specified ones of which are segmented by a plurality of punched holes, and specific ones of the core wires may also be used as adjacent module connection wires for connecting the adjacent modules. In similar fashion, the light-receiving signal transmission member may be a flat cable having a plurality of core wires, specified ones of which are segmented by a plurality of punched holes, and specific ones of the core wires may also be used as adjacent module connection wires for connecting the adjacent modules.

The employment of this flat cable can easily realize the common conduction wire and the adjacent module connection wire easily on the flat cable simply by forming the punched holes at appropriate pitches on a specified core wire and segmenting it.

Alternatively, the light projection optical system includes a light projection element, and the circuit parts corresponding to the light projection element, the light projection circuit and the flip-flop are accommodated in an IC package, while the lead pins of the IC package are used as pressure contact lead pins for connecting the flat cable, so that the IC package can be connected under pressure on the flat cable. In similar fashion, the light-receiving optical system includes a light-receiving element, and the circuit parts corresponding to the light-receiving element, the light-receiving circuit and the flip-flop are accommodated in an IC package, while the lead pins of the IC package are used as pressure contact lead pins for connecting the flat cable, so that the IC package can be connected under pressure on the flat cable.

With this configuration, without any socket structure on the side of the flat cable, the IC package can be easily connected at an arbitrary position on the flat cable, so that the length of the light projection/light-receiving columnar member and the number and pitches of optical axes can be changed in more versatile way.

The light projection module is integrated through the optical part holder with the lens member making up the light projection optical system having an optical axis aligned with that of the IC package accommodating the optical element. In the IC package, at least the light projection element is mounted on the lead frame, which is formed integrally as the same member as the lead pins, the bent portion of each lead pin is formed with a positioning hole, and the optical part holder is formed with a positioning protrusion at a position corresponding to the positioning hole formed at the bent portion of each lead pin.

Similarly, the light-receiving module is integrated through the optical part holder with the lens member making up the light-receiving optical system having an optical axis aligned with that of the IC package accommodating the optical element. In the IC package, at least the light-receiving element is mounted on the lead frame, which is formed integrally as the same member as the lead pins, the bent portion of each lead pin is formed with a positioning hole, and the optical part holder is formed with a positioning protrusion at a position corresponding to the positioning hole formed at the bent portion of each lead pin.

With this configuration, in the case where the IC package is mounted on the flat cable, the optical element (the light projection element or the light-receiving element) can be set in position with respect to the lens member without using the outer shape of the mold of the IC package or the like in such a manner that the positioning hole formed in the bent portion of each lead pin coincides with the positioning protrusion of the optical part holder, thereby improving the positioning accuracy.

In the process, the positioning hole may be formed in the bent portion of the lead pin. In this configuration, the IC package is defined as the upper member and the flat cable as the lower member. Then, the lower side of the inner periphery of the hole works as a pad for sticking each lead pin into the flat cable, while the side of the inner periphery existing in the plane perpendicular to the vertical direction works as a positioning contactor in the longitudinal and lateral directions. When sticking the IC package into the flat cable, therefore, the lead pin is pressed down from just above and therefore hardly displaced. This leads to the advantage that even a slight displacement of the optical element on the lead frame hardly occurs and the right optical axis is maintained.

The positioning hole, if rectangular in shape, can be configured of linear sides in all of the longitudinal, lateral and vertical directions.

In the light projection signal transmission member, the common conduction wire for uniformly connecting from the light projection module located at an end of the light projection module string to the light projection module located at the other end thereof includes a light projection current supply wire, a shift clock wire and a ground wire. At the same time, one of the wires between the adjacent modules may be connected with the D input terminal of the flip-flop and the other with the Q output terminal of the flip-flop. Similarly, in the light-receiving signal transmission member, the common conduction wire for uniformly connecting from the light-receiving module located at an end of the light-receiving module string to the light-receiving module located at the other end thereof includes a light-receiving current supply wire, a shift clock wire and a ground wire. At the same time, one of the wires between the adjacent modules may be connected with the D input terminal of the flip-flop and the other with the Q output terminal of the flip-flop.

With this configuration, the electrical circuit in the IC package can be appropriately operated-simply by appropriately designing the arrangement of the terminal pins of the IC package.

According to this invention, the desired number of individual single-beam modules (the light projection modules or the light-receiving modules) are arranged repeatedly at the desired intervals with each other and connected to the conduction wires (the common conduction wire and the adjacent module conduction wires) of the signal transmission member (the light projection signal transmission member or light-receiving signal transmission member). Without regard to the number of optical axes, therefore, the light curtain can be fabricated while the required parts used for at least each optical axis are concentrated in the light projection module and the light-receiving module.

DESCRIPTION OF THE PREFERRED EMBODIMENTS

Figure 1:
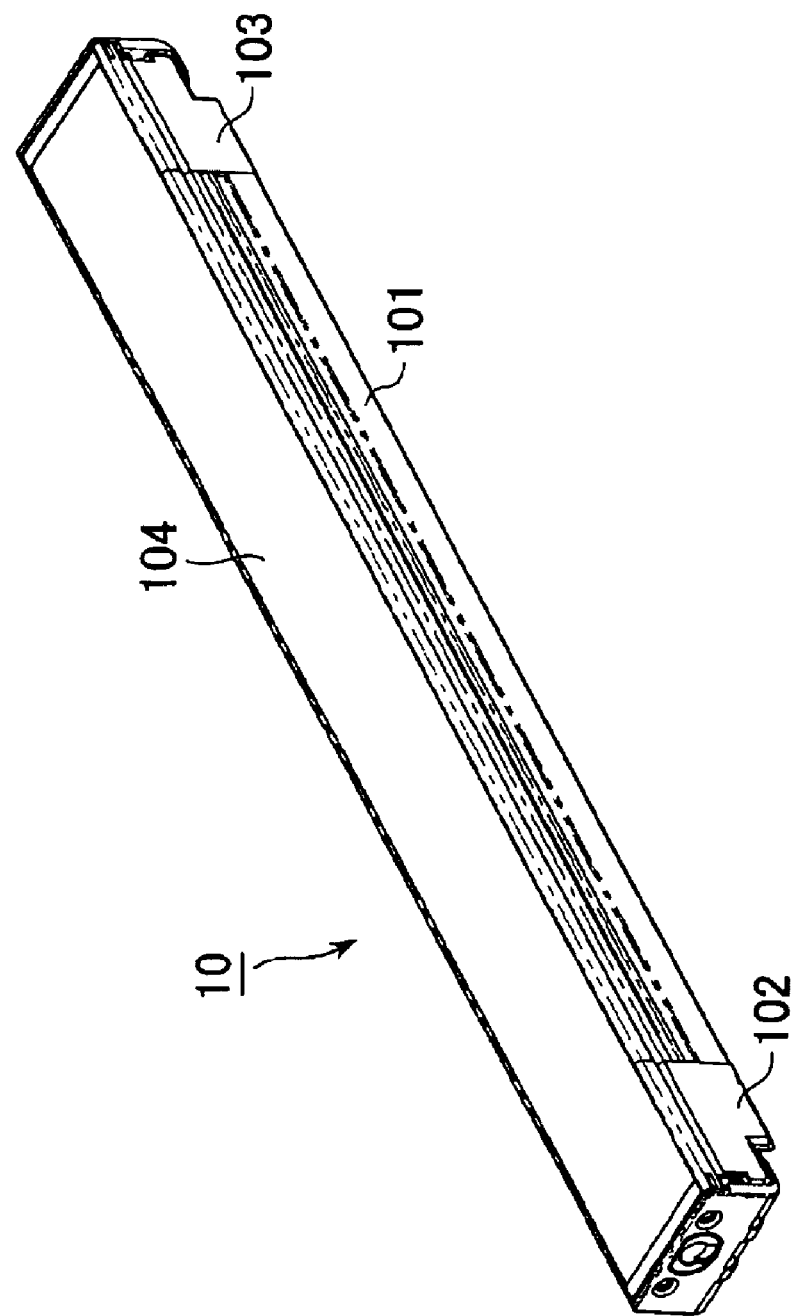
FIG. 1 shows a perspective view of the appearance of the light projection (or light-receiving) columnar member according to the invention.

A preferred embodiment of the invention is explained in detail below with reference to the accompanying drawings. A perspective view of the appearance of a light projection (or a light-receiving) columnar member according to this invention is shown in FIG. 1. As shown in FIG. 1, the multi-beam photoelectric sensor according to this invention is used with a light projection columnar member and a light-receiving columnar member 10 arranged in opposed relation to each other.

The case of the columnar member 10 includes a columnar case body 101, an end cap 102 for closing up an end opening of the columnar case body, an end cap 103 for closing up the other end opening, and a front plate 104 for closing up the front side. As described in more detail later, the columnar case body 101, the end caps 102, 103 are made of metal and have a substantially U-shaped section. The front plate 104 is formed of plastics transparent to the light used. A sensor assembly 10A is accommodated in the columnar member 10.

Figure 2:
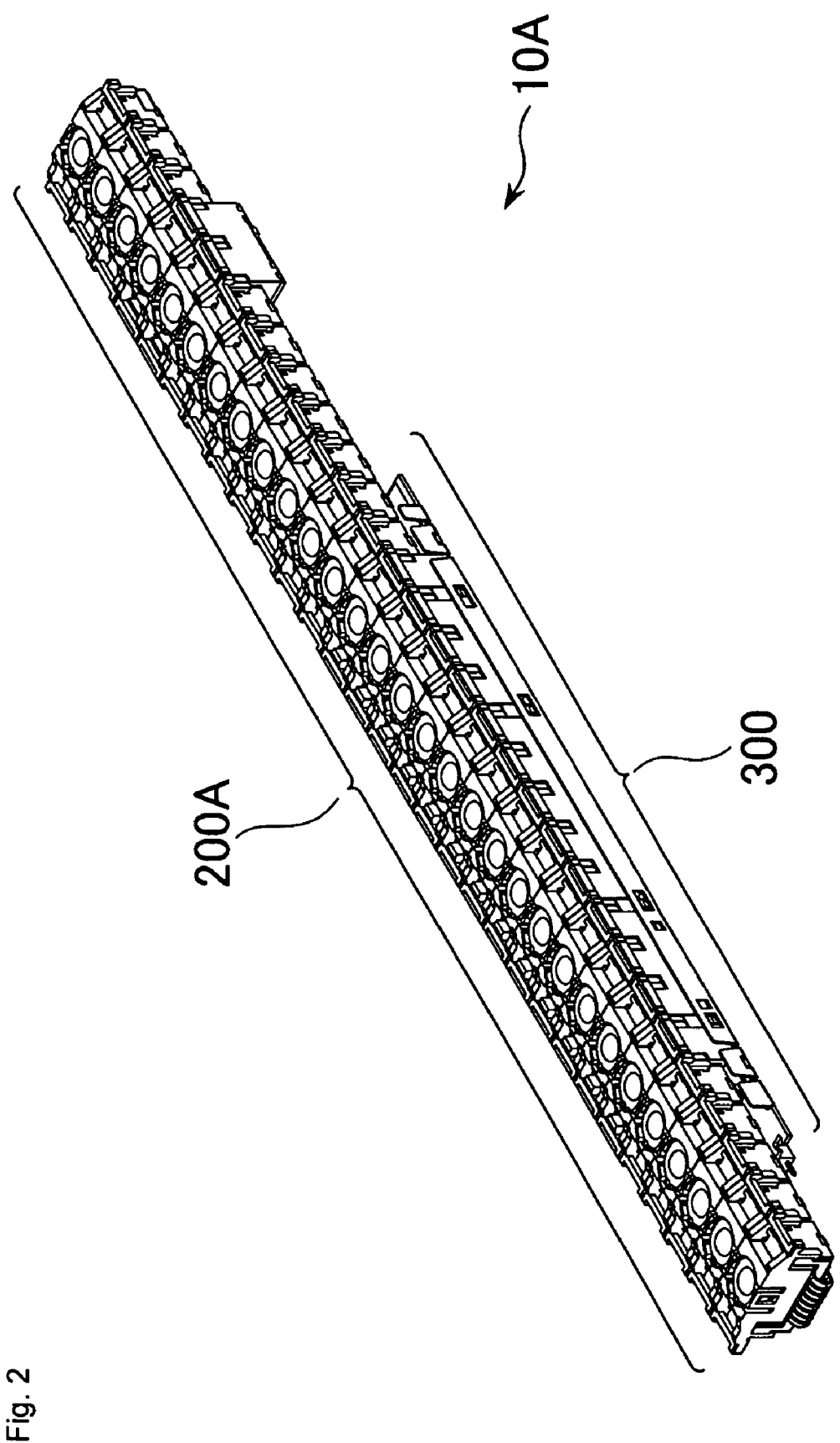
FIG. 2 shows a perspective view as taken from the obverse surface of the sensor assembly.
Figure 3:
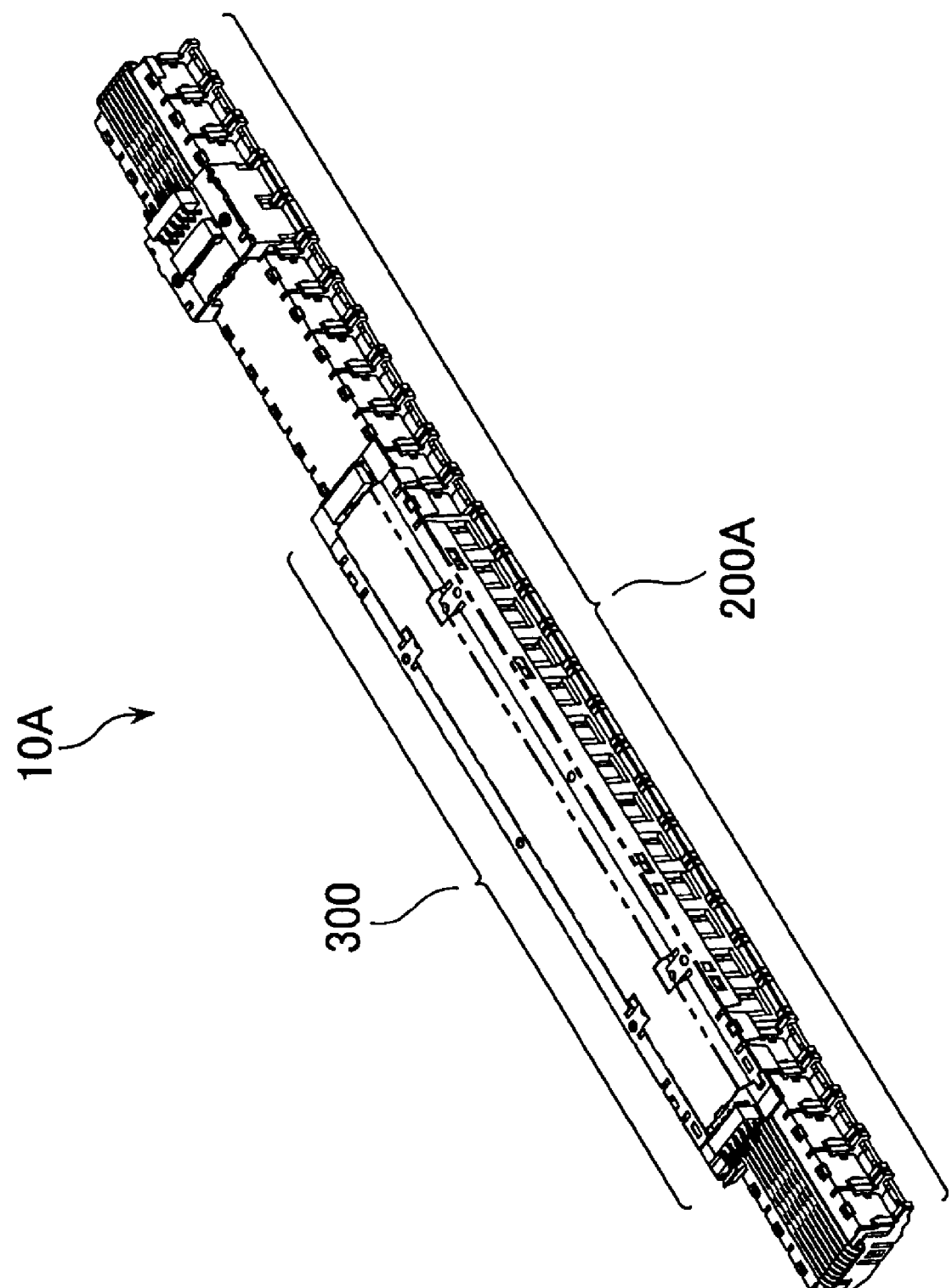
FIG. 3 shows a perspective view as taken from the reverse surface of the sensor assembly.

A perspective view of the sensor assembly taken from the obverse surface thereof is shown in FIG. 2, and a prospective view of the sensor assembly taken from the reverse surface thereof in FIG. 3. As apparent from these drawings, the sensor assembly 10A is configured mainly of a multi-beam assembly 200A, and a circuit part assembly 300 screwed to the reverse surface of the multi-beam assembly. As described in detail later, the multi-beam assembly 200A is built around a multiplicity of single-beam optical modules aligned integrally with each other. The circuit part assembly 300, on the other hand, is configured mainly of a circuit board having mounted a CPU or the like thereon. In these drawings, numeral 400 designates a connector part assembly.

Figure 4:
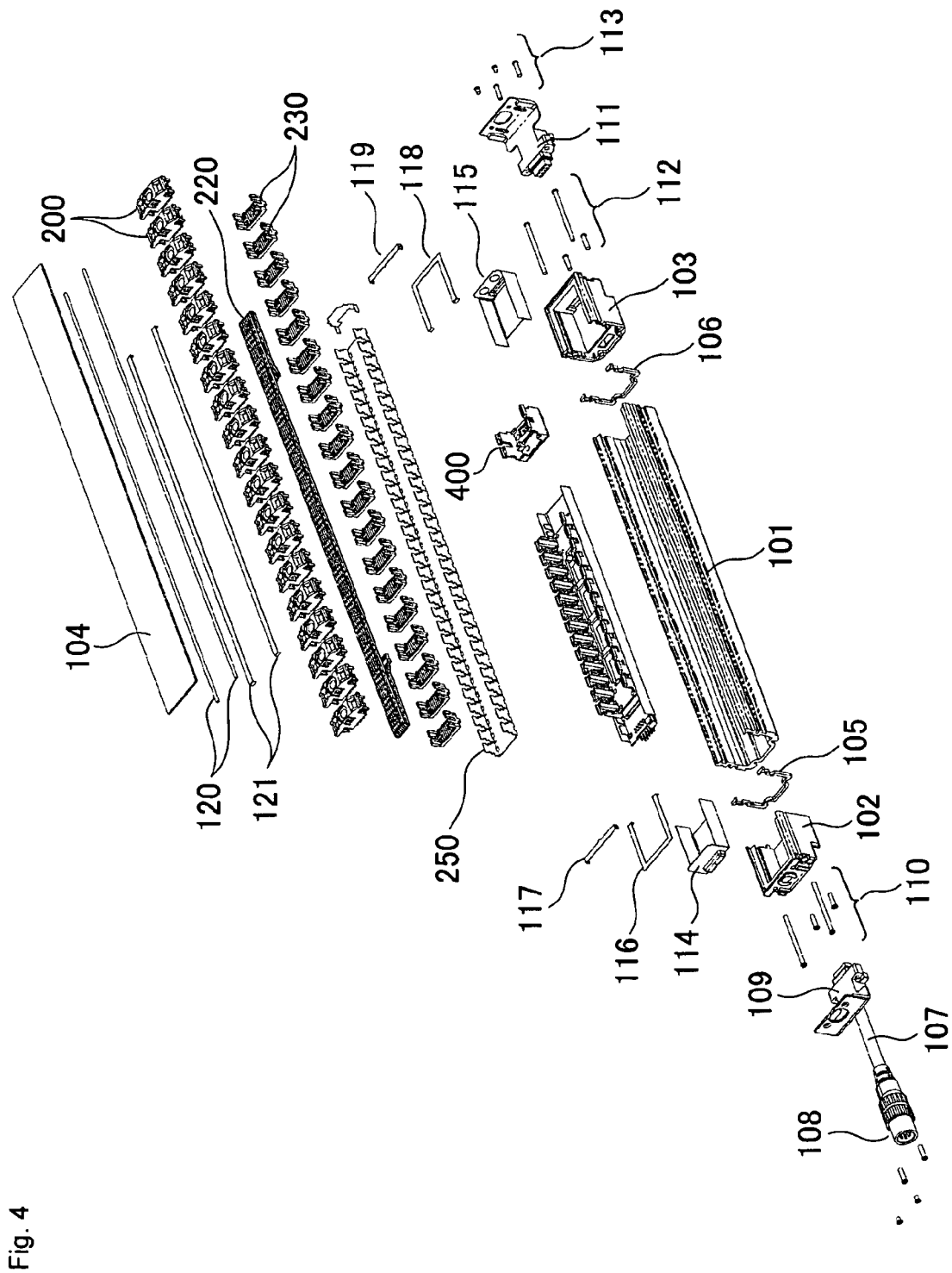
FIG. 4 shows an exploded perspective view of the sensor assembly.

An exploded perspective view of the sensor assembly is shown in FIG. 4. FIG. 4 also shows the case body 101, the end caps 102, 103 and the front plate 104 already explained above.

As explained above, the case for accommodating the sensor assembly 10A includes the columnar case body 101 having a substantially U-shaped cross section, the end caps 102, 103 similarly having a substantially U-shaped cross section for closing up the two end openings, respectively, and the front plate 104 for closing up the front opening.

More specifically, an end of the columnar case body 101 is closed up by the end cap 102 through a seal member 105 and fixed by screws 110. In similar fashion, the other end of the columnar case body 101 is closed up by the end cap 103 through a seal member 106 and fixed by screws 112. A plug 109 is inserted into the end cap 102 and fixedly screwed. The forward end of an electrical cord 107 drawn out of the plug 109 has an inter-cord connector 108 at the forward end thereof. This electrical cord 107 is used for connecting one or at least two light projection (or light-receiving) columnar members 10.

On the end cap 103 at the other end, on the other hand, a socket 111 corresponding to the plug 109 is fixed through screws 113. On the front opening of the columnar case having a substantially U-shaped cross section configured in this manner, the front plate 104 is fixed by adhesive through rubber packings 120, adhesive sheets 121, seal members 116, 117, 118, 119 and insulating sheets 114, 115. The multi-beam assembly 200A includes as many single-beam optical modules 200 as the optical axes, a flat cable 220, as many cable holders 230 as the optical axes and a support frame 250.

Figure 5:
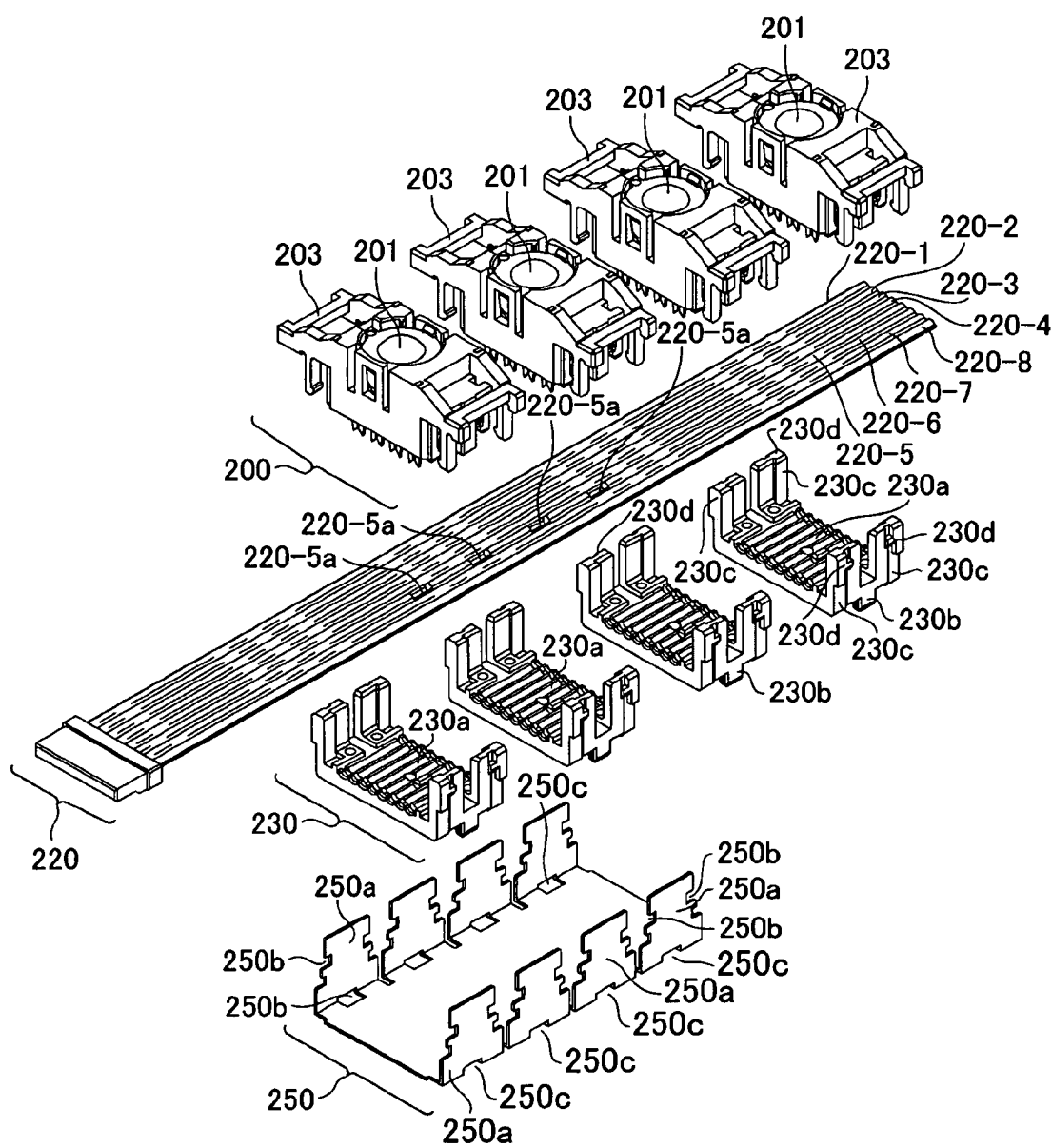
FIG. 5 shows an exploded perspective view of the multi-beam assembly.

An enlarged exploded perspective view of the multi-beam assembly is shown in FIG. 5. FIG. 5 shows the portion of the multi-beam assembly corresponding to four optical axes. As apparent from FIG. 5, the single-beam optical modules 200 each include several optical parts with the lens members 201 combined and unified by the optical part holders 203 of resin, and as described in detail later, pressure contact terminal pins 205a are projected from the lower surface thereof.

The flat cable 220 accommodates a plurality of parallel core wires under a resin band cover and has the length adjustable arbitrarily by cutting with scissors or cutter. This example has eight core wires including a first core wire 220-1, a second core wire 220-2, a third core wire 220-3, a fourth core wire 220-4, a fifth core wire 220-5, a sixth core wire 220-6, a seventh core wire 220-7, an eighth core wire 220-8. Among them, the fifth core wire 220-5 used both for the D input and the Q output of the D-type flip-flop is segmented by equidistant-punched holes 220-5a. This is by reason of the fact that although the other core wires can be shared by a plurality of single-beam optical modules 220, the fifth core wire 220-5 is required to be used for both the D input and the Q output of the D-type flip-flop in the single-beam optical module 200.

The cable holder 230 is a resin integrated molded product and includes centrally located backings 230a each having corrugated grooves on the surface thereof, and a four upright portions 230c, 230c, 230c, 230c erected from the four corners of the backing 230a. The upright portions 230c are each formed with a protrusion 230d. The protrusion 230d, as described in detail later, is engageably fixed in the recess 250c formed at the left and right edges of each upright portion 250a on a support frame 250.

The support frame 250 is a metal product (such as phosphor bronze) so shaped that a plurality of parts having a channel-shaped section are connected in the longitudinal direction. A recess 250b is formed at each of left and right edges of each pair of the opposed upright portions 250a, 250a having the channel-shaped portions. The recesses 250b are adapted to engage the protrusions 230d formed on the upright portions 250c of the cable holder 230. Also, a hole 250c is formed at the root of each upright portion 250a of the support frame 250. This hole 250c is fitted on the corresponding protrusion 230 formed on the lower surface of the cable holder 230 to set both of them in position.

As apparent from the foregoing description, the cable holders 230 are mounted on the opposed upright portions 250a, 250b formed on the support frame 250, so that the cable holders 230 are fixed in position at equal pitches. The flat cable 220 is placed on the backings 230a of the cable holders 230, and the single-beam optical modules 200 are laid on the assembly and pressed from above. Thus, the electrical conduction is secured between the single-beam optical modules 200 and the flat cable 220.

What is important is, as explained in detail later, that the optical parts (the light-emitting element and the light-receiving element), the drive circuits thereof and all the electrical circuit elements such as the D-type flip-flops corresponding to one stage of shift register are accommodated in the optical part holders 203, and therefore the longitudinal mounting position of the flat cable 220 of each single-beam optical module 200 is not restricted in any way. Thus, the number and pitches of the adjacent pairs of the opposed upright portions 250a, 250a formed on the support frame 250 can be freely set. At the same time, the number and pitches of the adjacent pairs of the opposed upright portions 250a, 250a directly correspond to the number and pitches of optical axes of the multi-beam photoelectric sensor. According to the invention, therefore, the design freedom of the number and pitches of optical axes is extremely improved.

Figure 6:
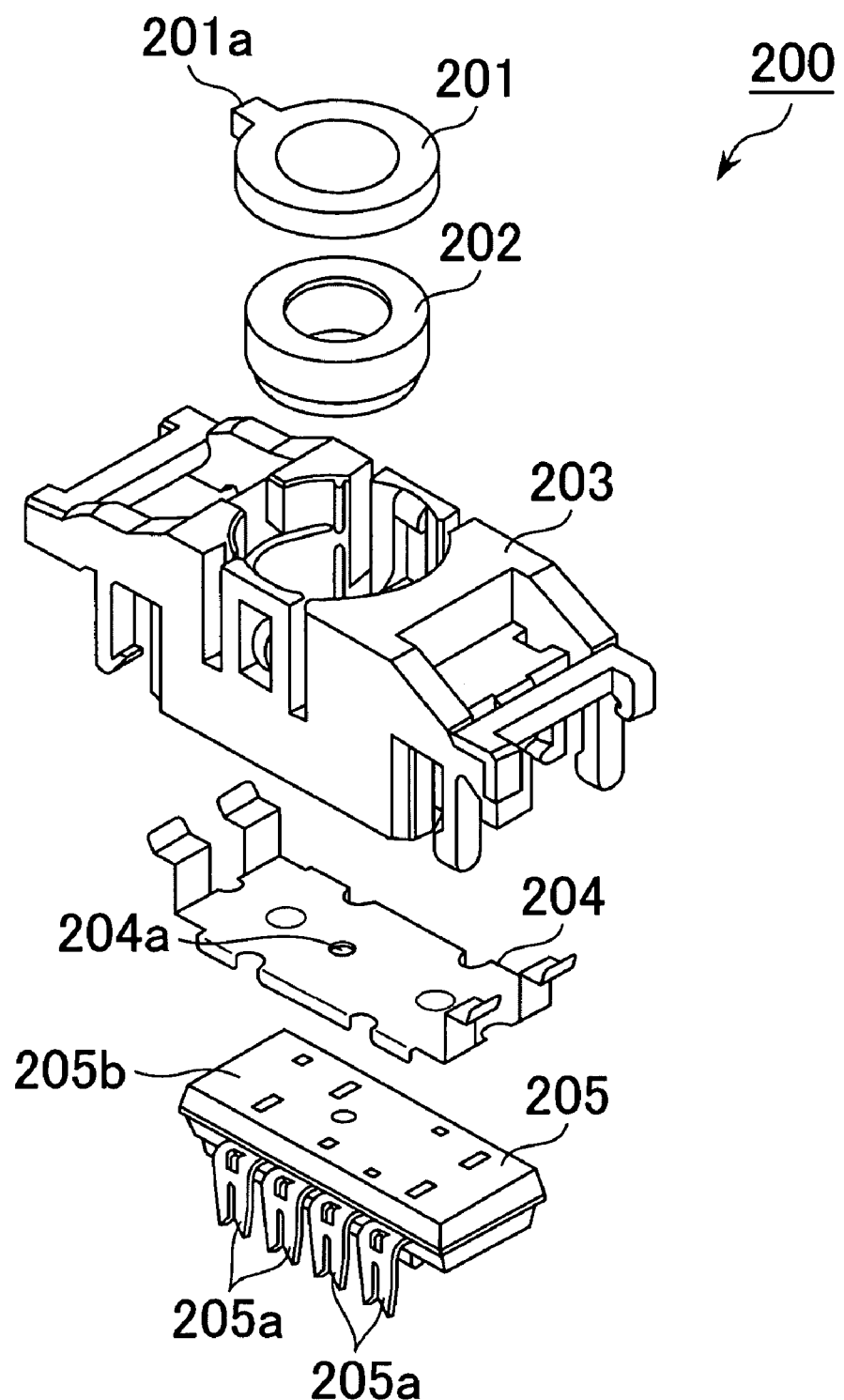
FIG. 6 shows an exploded perspective view (No. 1) of the single-beam optical module.

Next, several specific configurations of the single-beam optical module 200 are explained. An exploded perspective view (No. 1) of the single-beam optical module is shown in FIG. 6. In this case, the single-beam optical module 200 includes a lens member 201, a trap 202, an optical part holder 203, a shield plate 204 and a packaged optical IC 205. In FIG. 6, numeral 201a designates a protrusion for positioning the lens member, numeral 204a a hole for shaping the beam section, numeral 205a pressure contact terminal pins and numeral 205b a dual in-line package (DIP).

The lens member 201 is what is called the plastic lens, and has a positioning protrusion 201a formed on one side thereof. The trap 202 corresponds to the lens barrel of the optical system and has the axial center thereof aligned with that of the lens member 201. The optical part holder 203 is an integrated plastic molded product accommodating the lens member 201 and the trap 202 coaxially arranged with each other. On the bottom surface of the optical part holder 203, there are a shield plate 204 and the packaged optical IC 205 laid one on the other. A specific mounting structure is explained in detail later. The shield plate 204 functions as a shield against the packaged optical IC 205, and is configured of, for example, a metal part of phosphor bronze. A beam section shaping hole 204a is formed at about the central part of the shield plate 204.

The packaged optical IC 205 has a dual in-line package (DIP) 205b of transparent resin. The pressure contact terminal pins 205a are projected downward and supported from the two edges of the dual in-line package 205b. In this way, the concept of using the pressure contact pin 205a as each terminal pin of the dual in-line package 205b is a very novel idea unique to the inventors. The pressure contact terminal pins 205a are of course used as a connector for connecting the boards to each other as well as the legs of the packaged IC. Nevertheless, with this configuration in which the pressure contact terminal pins 205a are used as the terminal pins of the packaged optical IC 205 and inserted into the flat cable 220 so that the packaged optical IC 205 can be mounted at an arbitrary position along the length of the flat cable 220, the freedom of arranging the optical elements (the light-emitting element or the light-receiving element) is extremely improved for various optical devices including the multi-beam photoelectric sensor.

As explained later with reference to FIG. 24, the packaged optical IC 205 accommodates the optical elements (the light-emitting elements or the light-receiving elements), the drive circuits for the optical elements and the D-type flip-flops for sequentially operating the drive circuits.

Figure 24:
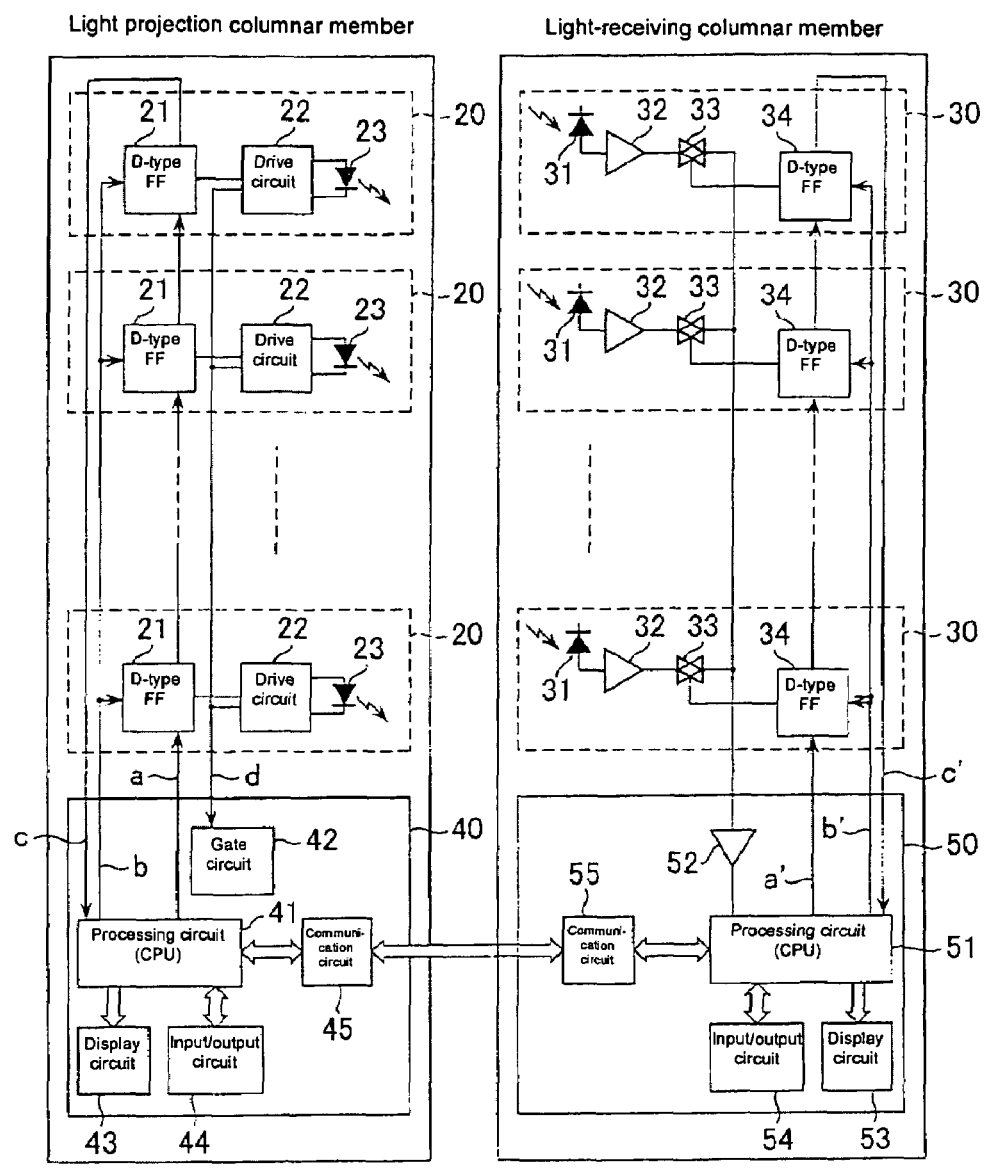
FIG. 24 shows a diagram showing a general circuit configuration of the multi-beam photoelectric sensor according to the invention.

A specific example of these internal circuits is shown in FIG. 24. As apparent from FIG. 24, the light projection columnar member accommodates a circuit 20, and the light-receiving columnar member a circuit 30. The circuit 20 includes D-type flip-flops (hereinafter referred to as D-type FFs) 21 making up one stage of shift register, drive circuits 22 each connected with the Q output of the corresponding D-type flip-flop 21, and light-emitting elements 23 driven by the output of the drive circuits 22. A multiplicity of D-type flip-flops 21 connected with each other make up a shift register, with the result that the circuits 20 are sequentially turned on (activated) one by one.

The circuit 30, on the other hand, includes light-receiving elements 31, amplifier circuits 32 for amplifying the output of the light-receiving elements 31, D-type flip-flops (hereinafter referred to as the D-type FFs) 34 making up one stage of shift register, and analog switches 33 interposed on the output side of the amplifier circuits 32 and turned on/ff by the Q output of the D-type flip-flops 34. Also in this case, the D-type flip-flops 34 are connected with each other to make up a shift register. Thus, the individual D-type flip-flops are sequentially turned on one by one.

As described above, according to this invention, the circuit 20 or 30 is accommodated in the packaged optical IC 205 and integrated as a single-beam optical module 200. The single-beam optical module according to the invention accommodates the circuit parts as well as the optical parts which are used for each optical axis. Regardless of the number of optical axes, therefore, an optical curtain can be fabricated by concentrating the parts required for at least each optical axis, in the light projection module or the light-receiving module. In this way, the number of types of the parts can be reduced.

This advantage of the improved design freedom is derived from the fact that the circuit 20 or 30 shown in FIG. 24 is accommodated in the single-beam optical module. It will be understood, therefore, that the circuit 20 or 30 thus accommodated is not necessarily an integrated packaged optical IC.

Specifically, according to the invention, the circuit 20 or 30 shown in FIG. 24 may be placed on a small dedicated circuit board and accommodated in the single-beam optical module 200. Alternatively, the flat cable can exhibit its function sufficiently with two parallel conduction patterns, and therefore can be replaced with a flexible circuit board of an appropriate length, if any. In such a case, a free connection structure such as a through hole connection can be employed in order to mount and secure the electrical conduction of the single-beam optical modules at arbitrary positions of the conductor pattern on the flexible board.

Figure 7:
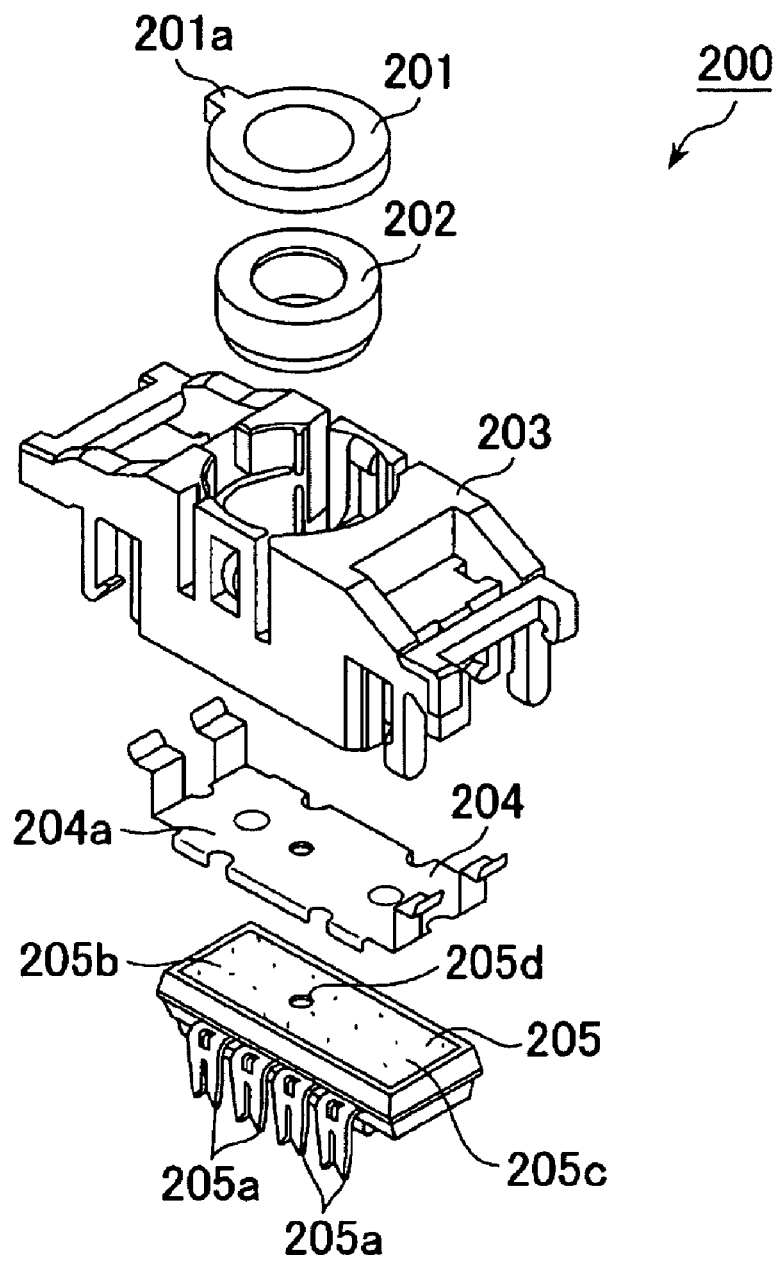
FIG. 7 shows an exploded perspective view (No. 2) of the single-beam optical module.

An exploded perspective view (No. 2) of the single-beam optical module is shown in FIG. 7. In this case, a mask print 205c having a window hole 205d is arranged on the upper surface of the dual in-line package 205b. The beam shaping function can be secured also by the mask print 205c and the window hole 205c. The mask print 205c can avoid the intrusion of a noise component into the built-in optical element while using the transparent resin as a package material.

Figure 8:
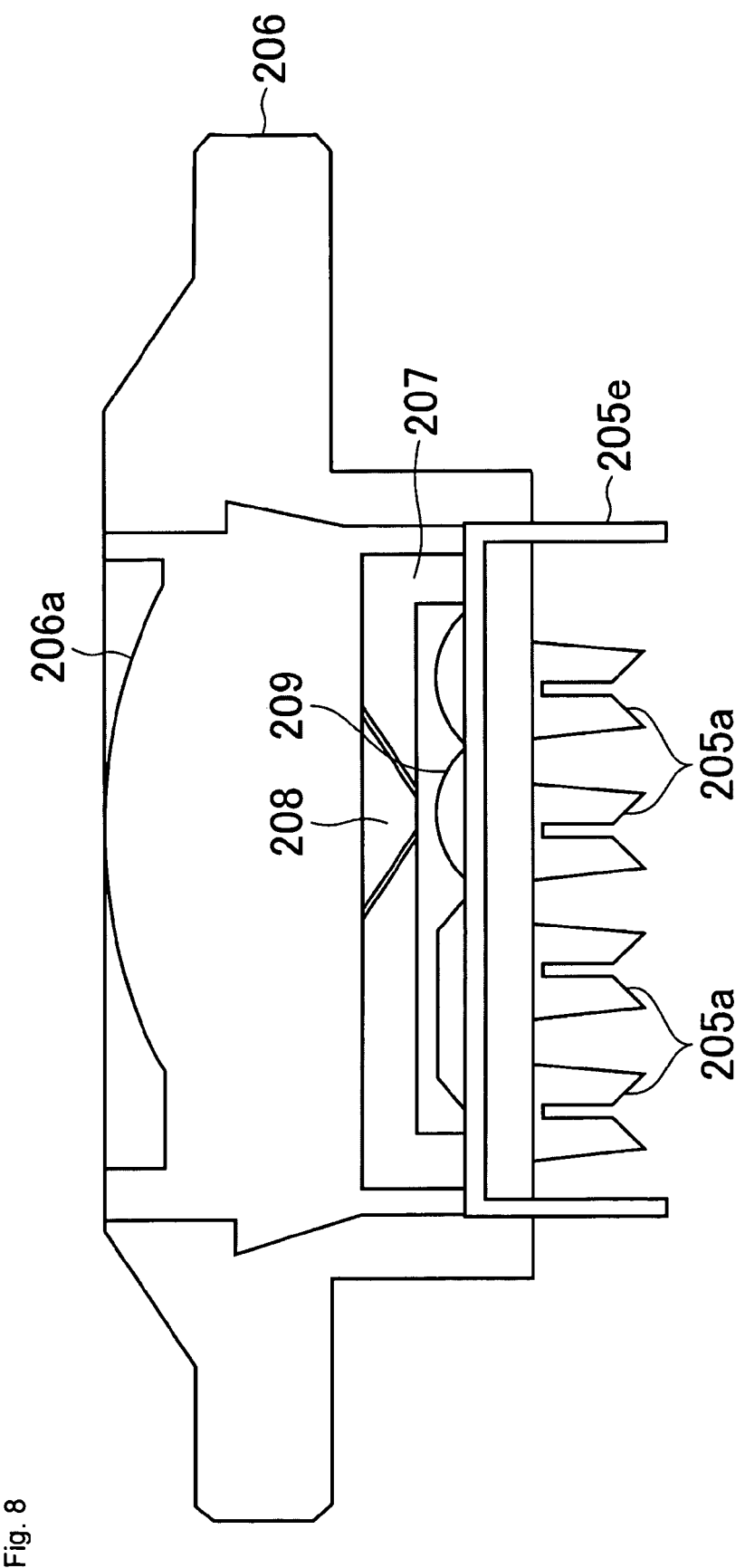
FIG. 8 shows a sectional view of the (integrated-type) single-beam optical module.

A sectional view of the single-beam optical module (integrated type) is shown in FIG. 8. In this case, unlike in FIGS. 6 and 7, the individual separate parts are not accommodated in the optical part holder 203, but coupled integrally with each other in advance by insertion molding. In FIG. 8, numeral 205a designates pressure contact terminal pins, numeral 205e a lead frame, numeral 206 a package with a lens, numeral 206a a lens structure, numeral 207 a mask member, numeral 208 a slit and numeral 209 an optical element.

As apparent from FIG. 8, in this case, the optical element 209 and other circuit parts are mounted on the lead frame 205c inserted in the package 206 with a lens, and integrally molded by resin together with the lens structure 206a.

Figure 9:
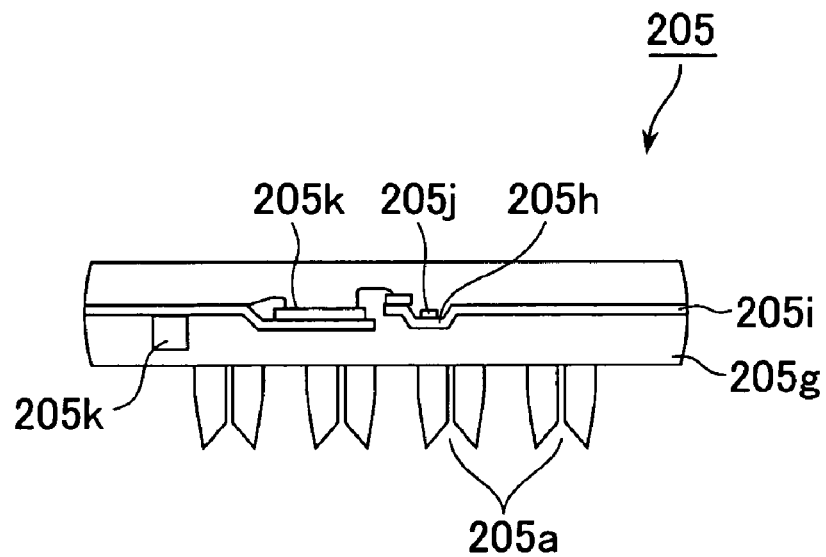
FIG. 9 shows a sectional view showing the internal structure of the packaged optical IC.
Figure 9:
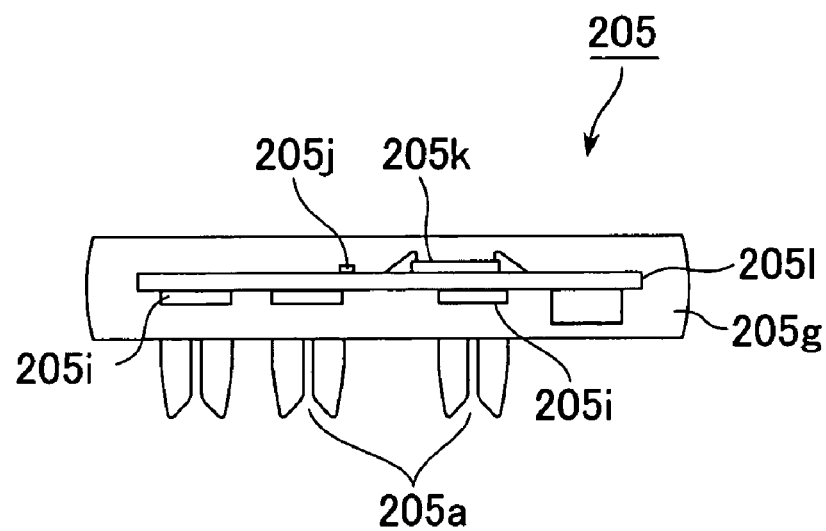

Next, a sectional view showing the internal structure of the packaged optical IC used for the structure of FIGS. 6 and 7 is shown in FIG. 9. FIG. 9a shows a lead frame mount type, and FIG. 9b a board mount type.

As explained above, in any of the types, the packaged optical IC having the pressure contact terminal pins 205a is a quite novel structure and a unique creation by the present inventors.

In the packaged optical IC 205 of lead frame mount type shown in FIG. 9a, the optical element 205j and the circuit part 205k are mounted directly on the lead frame 205i integrated with the pressure contact terminal pins 205a. Especially in the example under consideration, a reflector structure 205h recessed in the shape of bowl is formed by pressing on the lead frame 205i, and the optical element 205j is placed at the central part of the bottom thereof to improve the light projection or the light-receiving efficiency. Numeral 205g designates a transparent seal resin. Also, the shape of the forward end of each pressure contact terminal pin 205a is well known. Specifically, this forward end is forked into two left and right branches with sharp forward edges, while the core wire of the flat cable is pressure fitted into the slit between the two branches to assure electrical conduction therebetween. Further, in this example, a band-shaped conduction path is appropriately punched in the lead frames 205i in flat form thereby to secure the conduction paths for the individual circuit parts and the optical elements.

In the packaged optical IC of board mount type shown in FIG. 9b, on the other hand, a two-side circuit board 205l is arranged in addition to the lead frame 205i, and the optical element 205j and the circuit part 205k are mounted on the circuit board 205l. At the same time, the conduction pattern adapted to be connected to each of the pressure contact terminal pins 205a is formed on the lower surface of the circuit board 205l, and soldered with each lead frame 205i. In this way, the electric conduction is assured between the individual pressure contact terminal pins 205a, the optical element 205j and the circuit part 205k.

In this case, the provision of the board 205l in addition to the lead frames 205i increases the rigidity. This leads to the advantage that the rigidity of the circuit board 205l prevents the optical element 205j from being displaced even under the pressure of connecting the pressure contact terminal pins 205a.

Specifically, in the lead frame mount type shown in FIG. 9a, the optical element 205j is mounted on the lead frame 205i, and therefore, the inner lead frame is displaced under the pressure applied to the pressure contact terminal pins 205a, thereby often leading to the problem of slight displacement of the optical element 205j. In the board mount type shown in FIG. 9b, on the other hand, the position of the optical element 205j is advantageously prevented from being displaced even when the pressure contact terminal pins 205a are displaced by the rigidity of the board 205l.

Next, the positioning structure of the optical part holder and the packaged optical IC is explained. As shown in FIG. 9a, assume that the packaged optical IC 205 is used in which the optical element 205j and the circuit part 205k are mounted on the lead frame 205i and insertion molded using the seal resin 205g, while the terminal pins projected from the lead frame 205i are formed as the pressure contact terminal pins 205a, and that this packaged optical IC 205 is mounted on the lower surface of the optical part holder 203, as shown in FIGS. 6 and 7. The position of the optical element 205j in the packaged optical IC 205 is required to be matched accurately with the optical axis of the lens 201 placed in the optical part holder 203.

In a conceivable method to accomplish this configuration, a positioning protrusion is formed on the dual in-line package 205b of the packaged optical IC 205 and fitted in the corresponding positioning recess formed on the optical part holder 203. The employment of this positioning structure, however, could not necessarily match the position of the optical element 205f accurately with the optical axis of the lens 201 due to the forming error of the dual in-line package 205b.

According to this invention, instead of the package 205b of the packaged optical IC 205, a given part of the lead frame projected from the package 205b and the optical part holder 203 are set in position with each other, thereby making it possible to set the optical element 205f in the package 205b and the optical axis of the lens member 201 in position accurately with each other.

Figure 10:
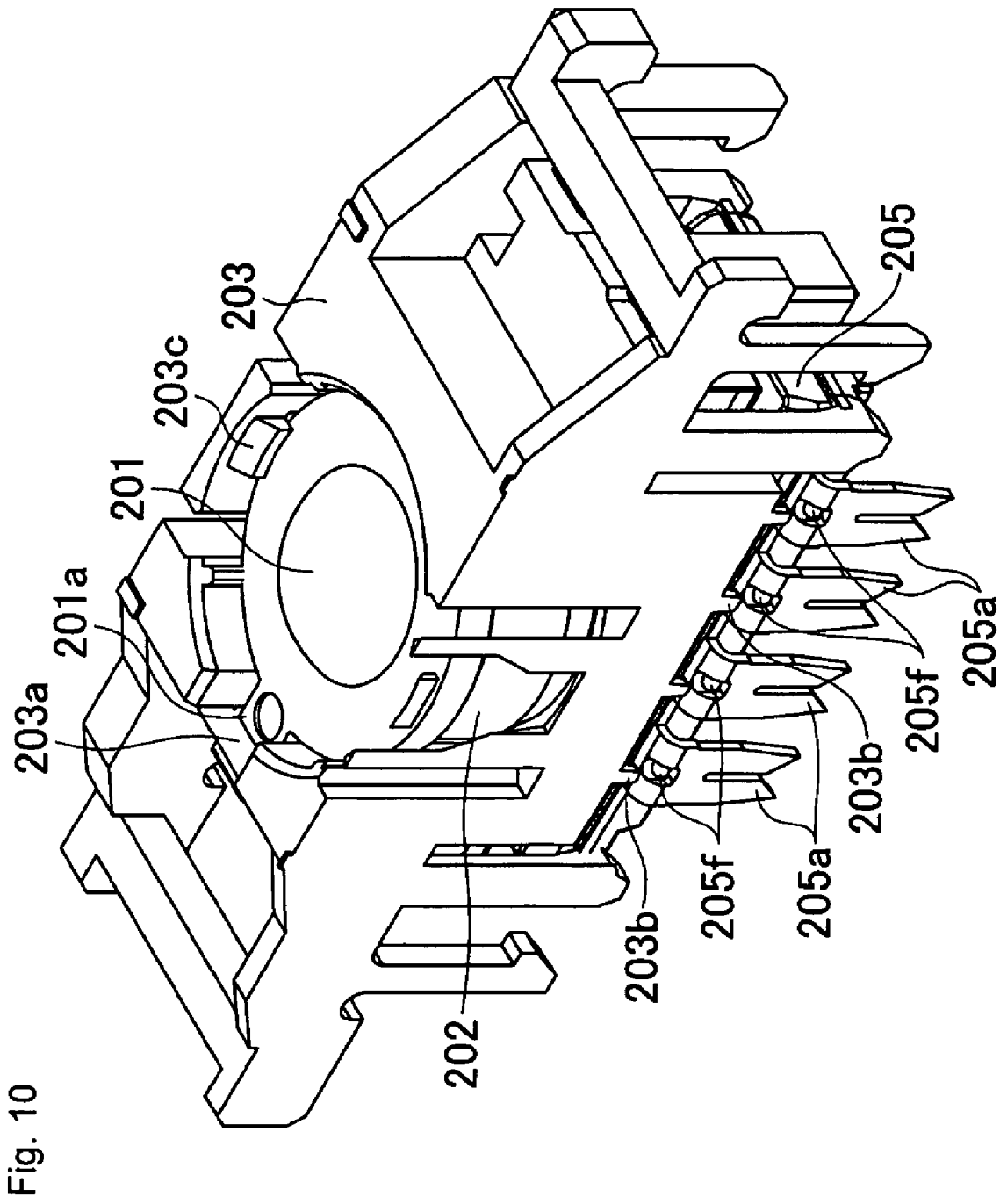
FIG. 10 shows a diagram (No. 1) for explaining the positioning structure of the optical part holder and the packaged optical IC.
Figure 11:
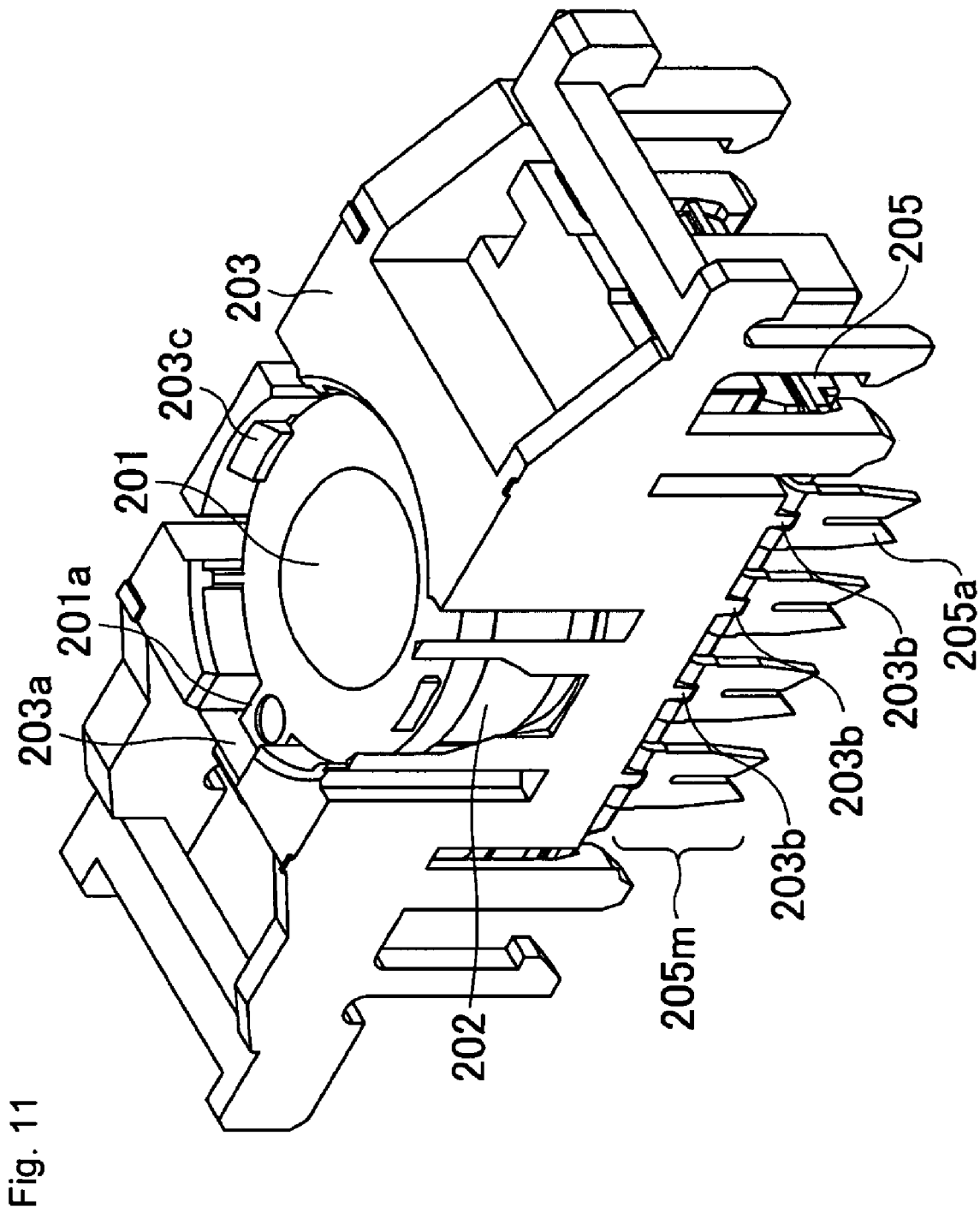
FIG. 11 shows a diagram (No. 2) for explaining the positioning structure of the optical part holder and the packaged optical IC.
Figure 12:
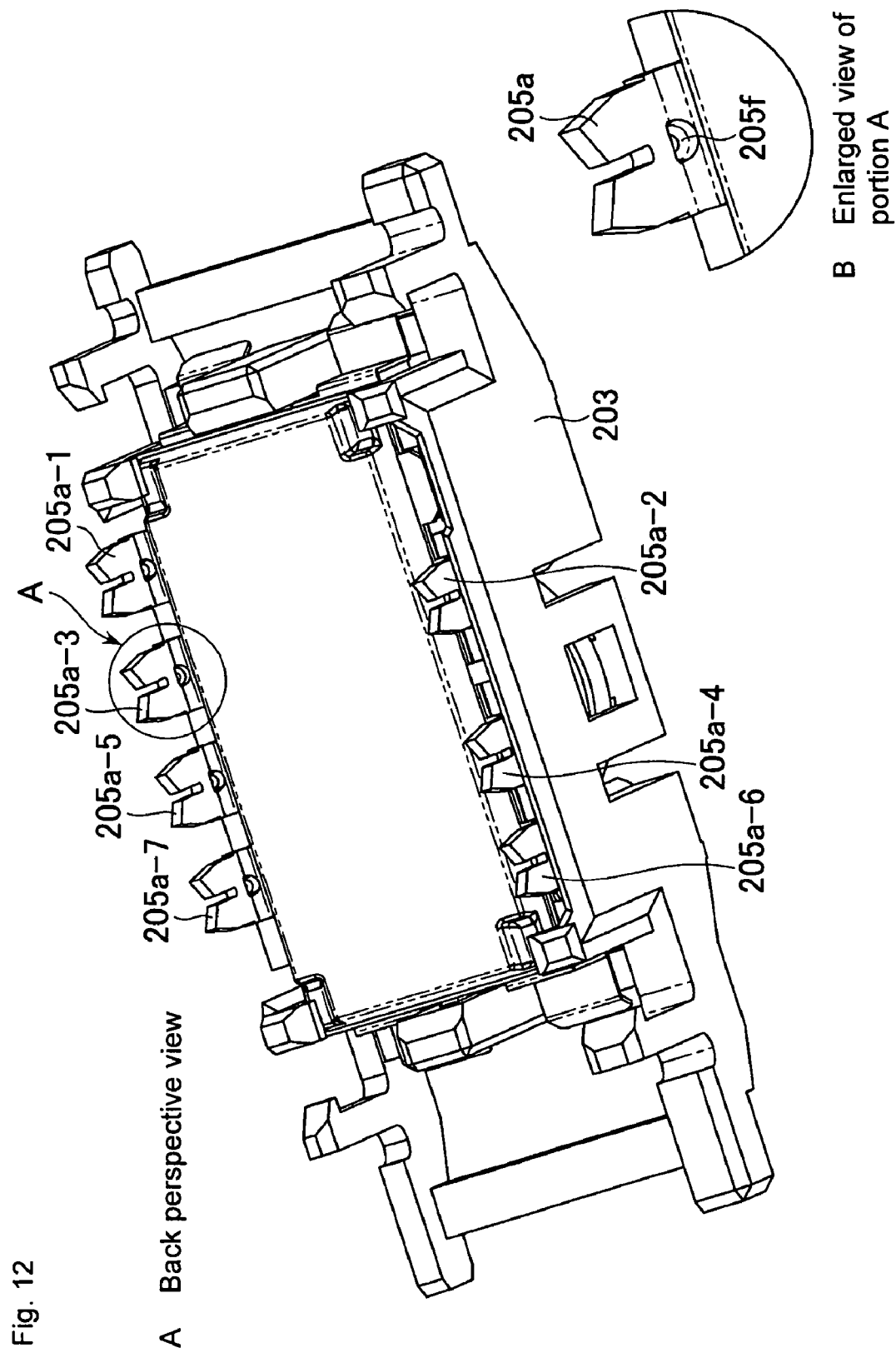
FIG. 12 shows a diagram (No. 3) for explaining the positioning structure of the optical part holder and the packaged optical IC.

The diagrams (Nos. 1 to 3) for explaining the positioning structure of the optical part holder and the packaged optical IC are shown in FIGS. 10 to 12, respectively. In FIG. 10, the packaged optical IC 205 and the optical part holder 203 are separated slightly in vertical direction from each other. As apparent from this diagram, the lower surface edges on the left and right sides of the optical part holder 203 are formed with a plurality of engaging protrusions 203b directed downward.

At the root (bent corner) of each pressure contact terminal pin 205a projected downward from the packaged optical IC 205, on the other hand, a plurality of engaging holes 205f are formed correspondingly to a plurality of engaging protrusions 203b, respectively, of the packaged optical IC 205. As shown in FIG. 11, once the package IC 205 is mounted completely on the optical part holder 203, the plurality of the engaging protrusions 203b of the package 205b are fitted in the engaging holes 205f located at the root of the pressure contact terminal pin 205a, so that the package 205b and the root of the pressure contact terminal pins 205a are accurately set in position.

Assume that the package 205b and the root of the pressure contact terminal pins 205a are set in position in this way. The pressure contact terminal pins 205a are integrated with the lead frame 205i, on which the optical element 205j is mounted, and the mounter accuracy maintains the optical element 205j at an accurate mounting position relative to the lead frame 205i. As far as the positioning accuracy between the optical part holder 203 and the lens 201 and the forming accuracy of the engaging protrusions 203b with respect to the optical part holder 203 are correctly controlled, therefore, the optical element 205j and the optical axis of the lens member 201 in the packaged optical IC 205 can be accurately set in position with each other.

In the process, the positioning holes 205f may be rectangular and formed in the bent portions of the lead pins. With this configuration, of all the sides of the inner periphery of the rectangular hole including the lower side, the upper side, right side and the left side, the horizontal lower side functions as a pad for piercing the lead pins, while the right and left sides work as a contact for positioning in lateral directions. As a result, when piercing an electronic part in the flat cable, the lead pins pushed from just above are hardly displaced. This substantially prevents even a slight displacement of the optical element on the lead frame hardly, thereby advantageously maintaining the performance to keep right optical axes.

The positions of the engaging holes 205f formed at the root of the pressure contact terminal pins 205a are shown in more detail in FIG. 12. Specifically, the engaging holes 205f are each accurately formed at the corners of the bent portion between the lead frame 205i and the pressure contact terminal pins 205a. Once the packaged optical IC 205 is mounted accurately on the lower surface of the optical part holder 203 as shown in FIG. 11, therefore, the engaging protrusions 203b come into contact with the upper end of the vertical extension 205m of each pressure contact terminal pin 205a. In the case where the forward end of the pressure contact terminal pin 205a is stuck on the flat table and pressured to break the covering of the flat table, therefore, pressure is exerted on the lower surface of the inner periphery of the engaging holes 205f from just above. The downward pressure applied to the optical part holder 203, therefore, is transmitted efficiently to the vertical extension 205m of each terminal pin 205a, resulting in the advantage that the pressure contact terminal pins 205a are difficult to displace.

Specifically, the displacement of the vertical extension 205m causes the chain reaction in which the lead frame 205i in the packaged optical IC 205 is displaced, which in turn may displace the optical element 205j mounted thereon. The relative positions of the engaging protrusions 203b and the engaging holes 205f described above, however, makes it difficult to displace the pressure contact terminal pins 205a thereby advantageously suppressing the displacement of the optical element.

Figure 13:
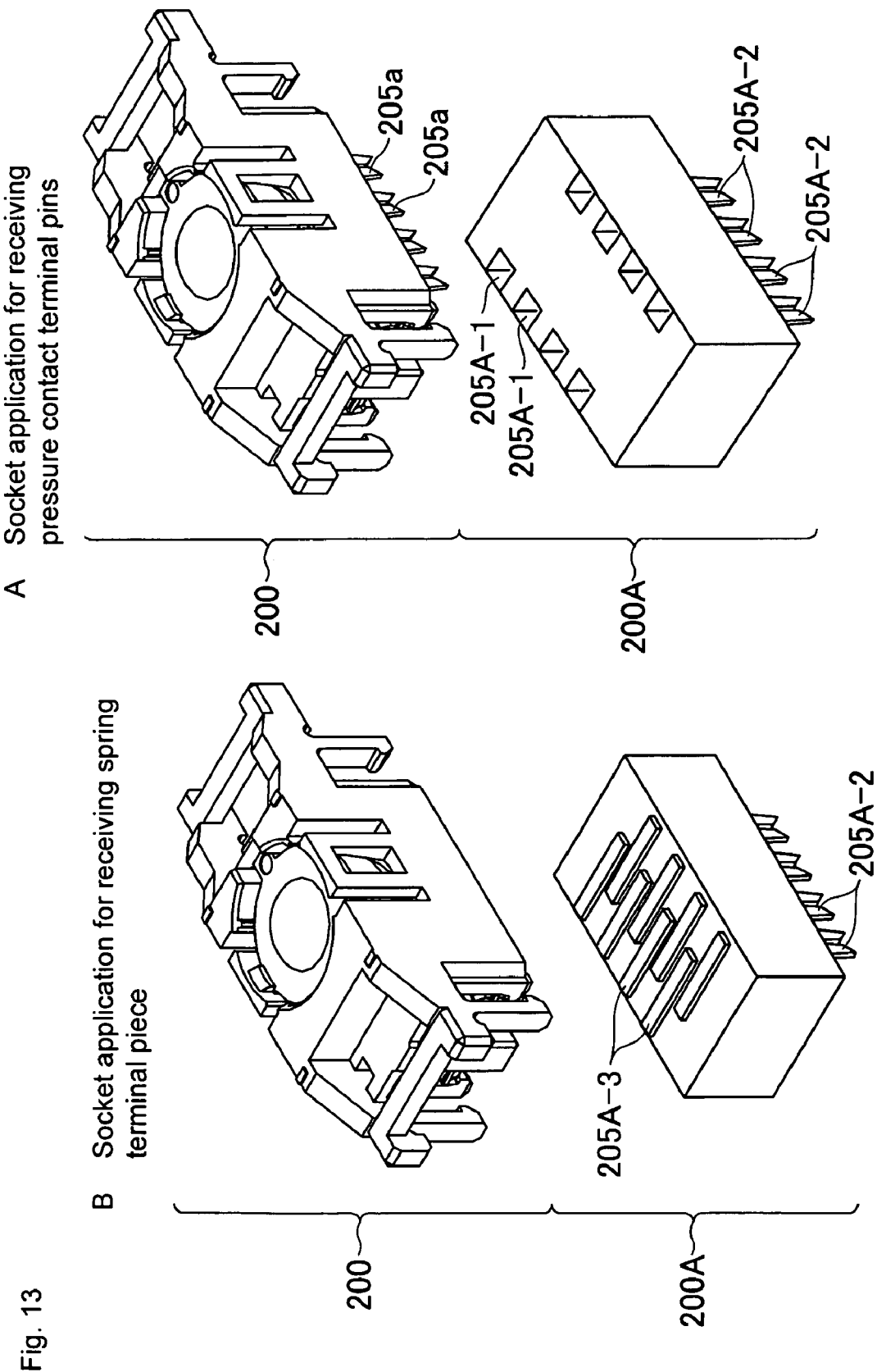
FIG. 13 shows a diagram for explaining a modification of the single-beam optical module.

A diagram for explaining the single-beam optical module according to a modification is shown in FIG. 13. FIG. 13a shows a case using receptacles or sockets for the pressure contact terminal pins, and FIG. 13b an example of the application of receptacles or sockets for receiving springs. As explained above with reference to the circuit diagram of FIG. 24, the main feature of the single-beam optical module according to the invention resides in that the electrical circuit parts as well as the optical parts are accommodated and that the single-beam optical module can be easily mounted at an arbitrary longitudinal position on the flat cable or the flexible circuit board.

This fact, or especially the latter point described above, indicates that as long as the pressure contact terminal pins or universal contactors are projected from the bottom surface of the single-beam optical module, the optical part case or the circuit part assembly should be able to be accommodated in any form. By dividing the single-beam optical module into vertical halves and using the lower portion as a socket and the upper portion as a part case, therefore, the replacement for repair or maintenance can be facilitated.

From this standpoint, an example of design is shown in FIGS. 13a, 13b. In the case of FIG. 13a, the single-beam optical module 200 is similar to the one described above, although a socket 200A is interposed between the single-beam optical-module 200 and the flat cable 220. The upper surface of the socket 200A is formed with holes 205A-1 to receive the pressure contact terminal pins 205a of the single-beam optical module 200 while pressure contact terminal pins 205A-2 are projected from the bottom surface of the socket 200A to be pierced into each core wire of the flat cable.

In the case of FIG. 13b, on the other hand, a spring contactor (not shown) is projected from the bottom surface of the single-beam optical module 200. Also, a socket 200A is interposed between the single-beam optical module 200 and the flat cable 220. The upper surface of the socket 200A is formed with conductor patterns 205A-3 adapted for contact with the spring contactor, not shown, projected from the bottom surface of the single-beam optical module 200. Each of the conductor patterns 205A-3 is electrically connected to the corresponding pressure contact terminal pin 205A-2 projected from the bottom surface, and the pressure contact terminal pins 205A-2 projected from the socket 200A are pierced into the core wires of the flat cable 220 thereby to secure electric conduction. In this way, the single-beam optical module can assume any of various structures.

Figure 14:
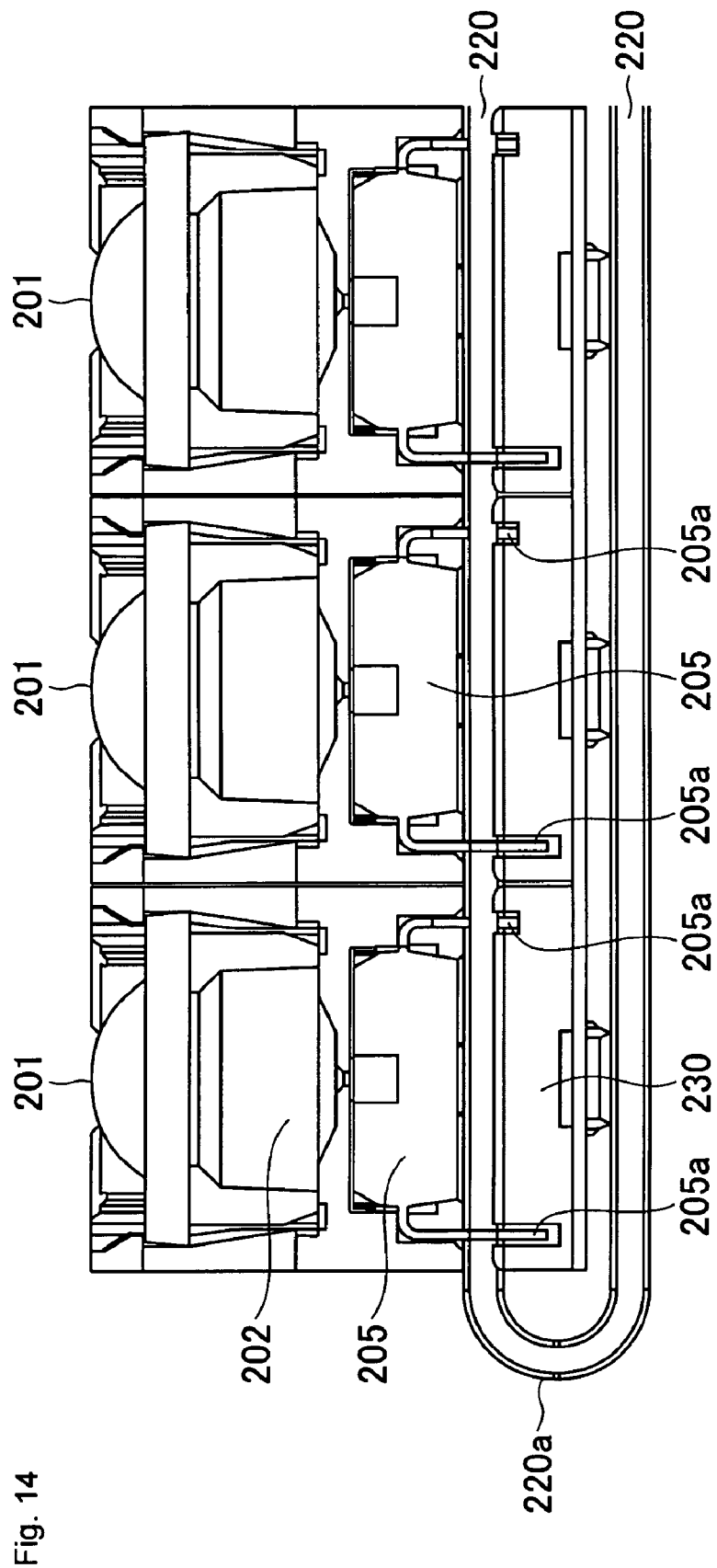
FIG. 14 shows a sectional view showing the connection between the flat cable and the pressure contact terminal pins.

A sectional view of the connection between the flat cable and the pressure contact terminal pins is shown in FIG. 14. In FIG. 14, numeral 201 designates lens members, numeral 202 traps, numeral 205 packaged optical ICs, numeral 220 a flat cable, numeral 220a a bent portion of the flat cable, numeral 205a pressure contact terminal pins, and numeral 230 a cable holder. As apparent from FIG. 14, the pressure contact terminal pins 205a are pierced through the flat cable 220 and extend out of the lower surface thereof. In the process, each core wire of the flat cable 220 is pressure fitted into the slit at the forward end of the corresponding terminal pin 205a thereby to secure electrical conduction between them. The flat cable 220 is bent at the extreme end portion 220a of the single-beam optical modules in alignment, and folded along the bottom of the cable holder 230.

Figure 15:
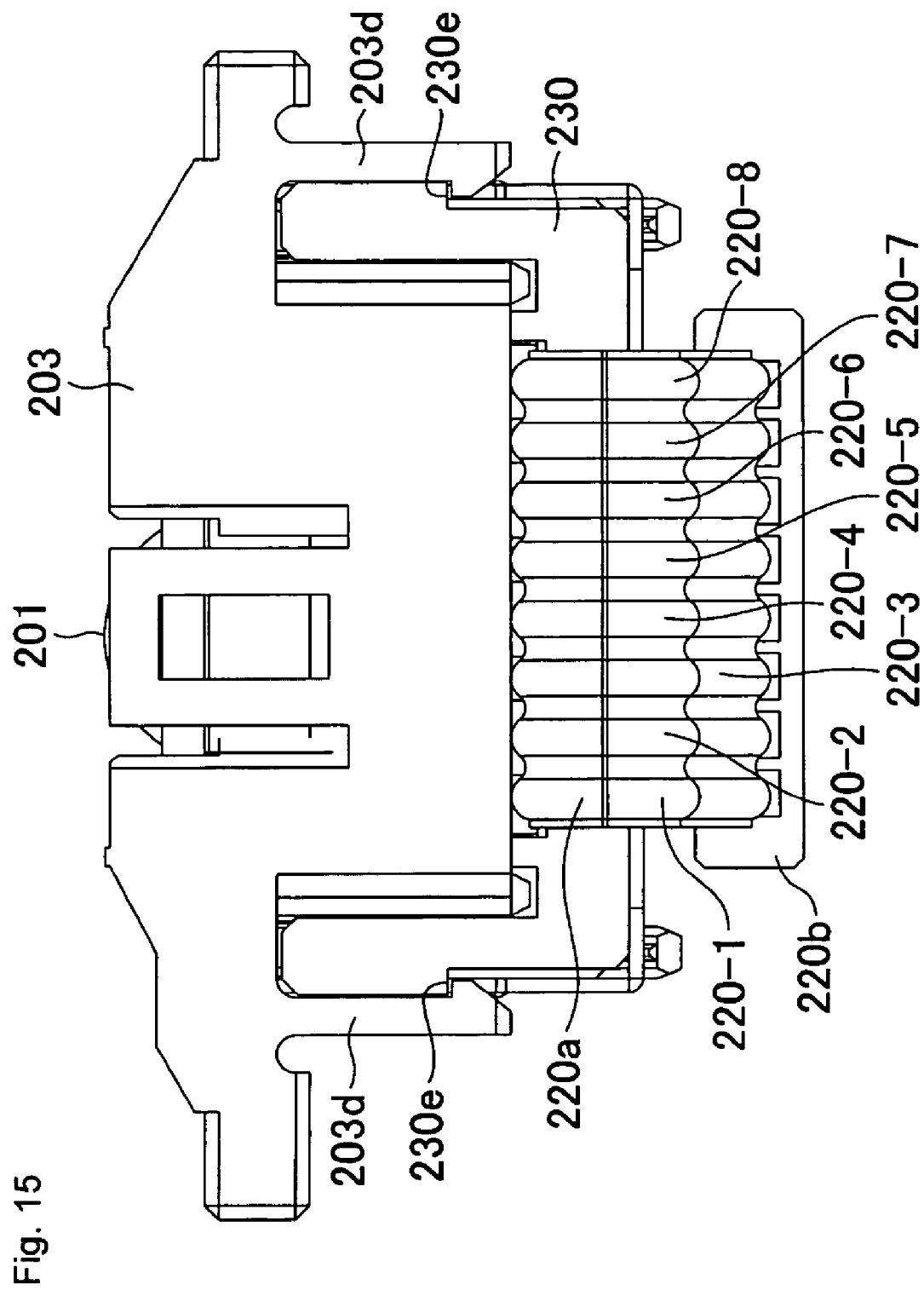
FIG. 15 shows a diagram for explaining the structure for holding the flat cable.

A diagram for explaining the structure for holding the flat cable is shown in FIG. 15. In FIG. 15, numeral 201 designates a lens member, numeral 203 an optical part holder, numeral 230 a cable holder, numeral 203d engaging hooks of the optical part holder, numeral 230e engaging steps of the cable holder, numeral 220a bent portions of the flat cable, numeral 220b a cable connector and numerals 220-1 to 220-8 first to eighth core wires, respectively, of the flat cable.

As apparent from FIG. 15, the flat cable 220 is held sandwiched between the bottom of the optical part holder 203 in an upper position and the backing 230a of the cable holder 230 in a lower position. The optical part holder 203 and the cable holder 230 are firmly fixed by engagement between the engaging hooks 203d and the steps 230e.

Figure 17:
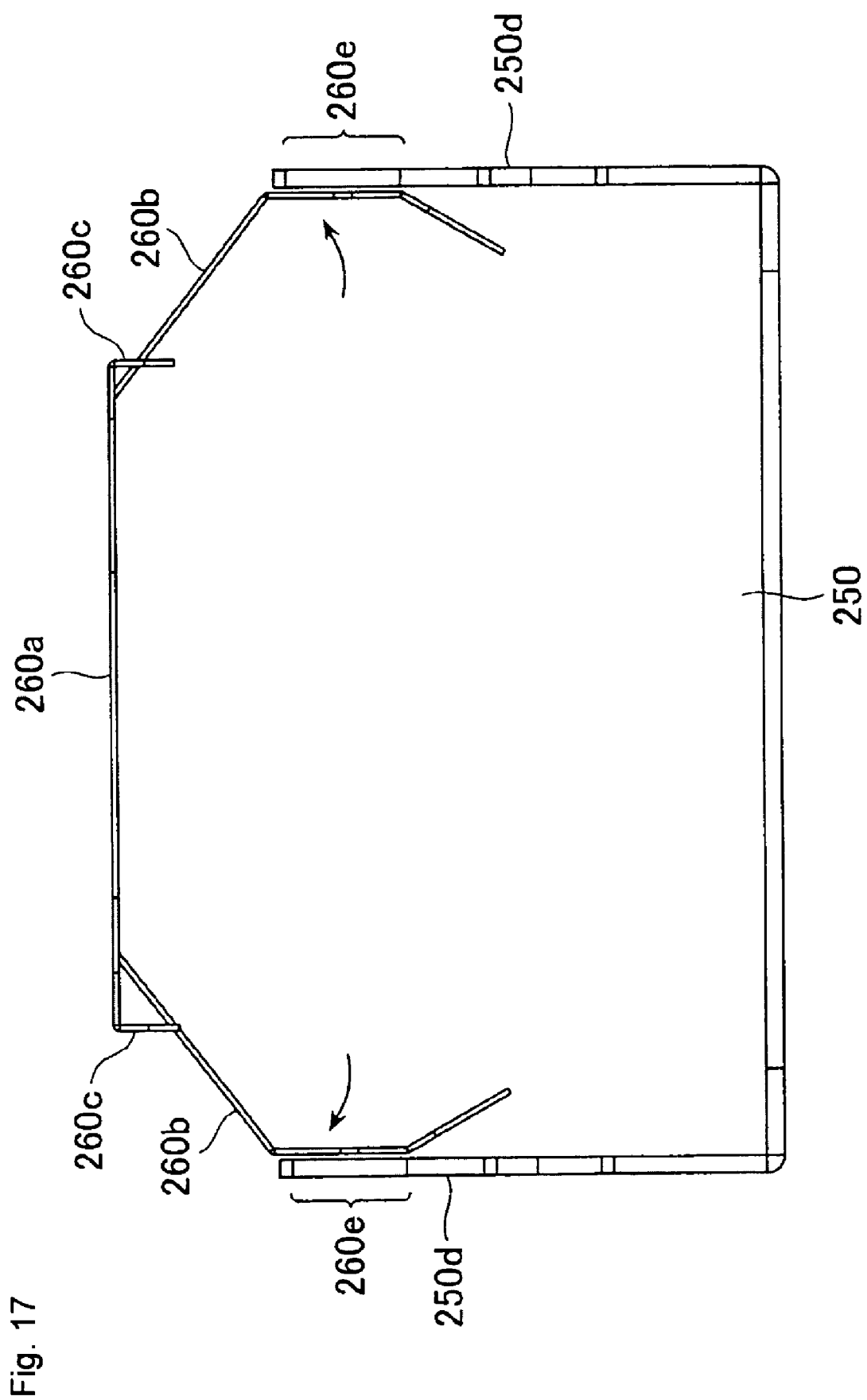
FIG. 17 shows a diagram for explaining the structure for conduction between the shield member and the support frame.
Figure 18:
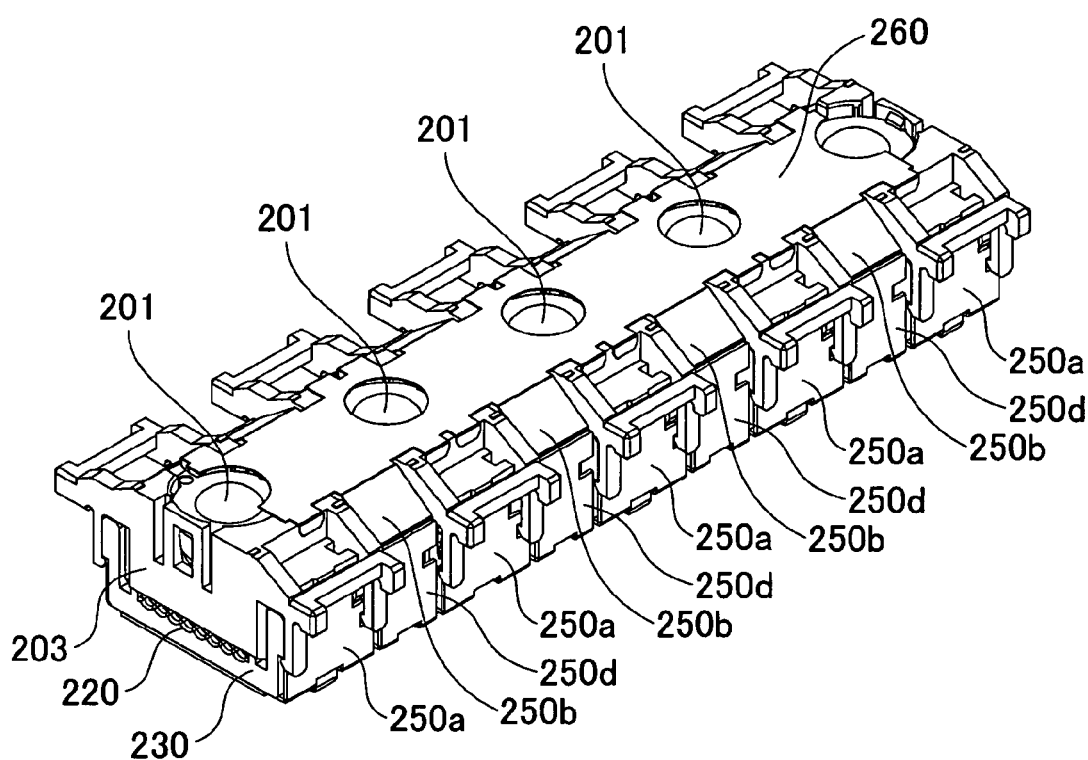
FIG. 18 shows an exploded perspective view showing the state after assembling the shield member.

A structure of a shield member is explained which is used to avoid the effect of noises of the multi-beam photoelectric sensor in whatever adverse noisy environment of a production field. An exploded perspective view of the state before assembling the shield member is shown in FIG. 16, a diagram for explaining the structure for conduction between the shield member and the support frame is shown in FIG. 17, and an exploded perspective view of the state after assembling the shield member is shown in FIG. 18.

Figure 16:
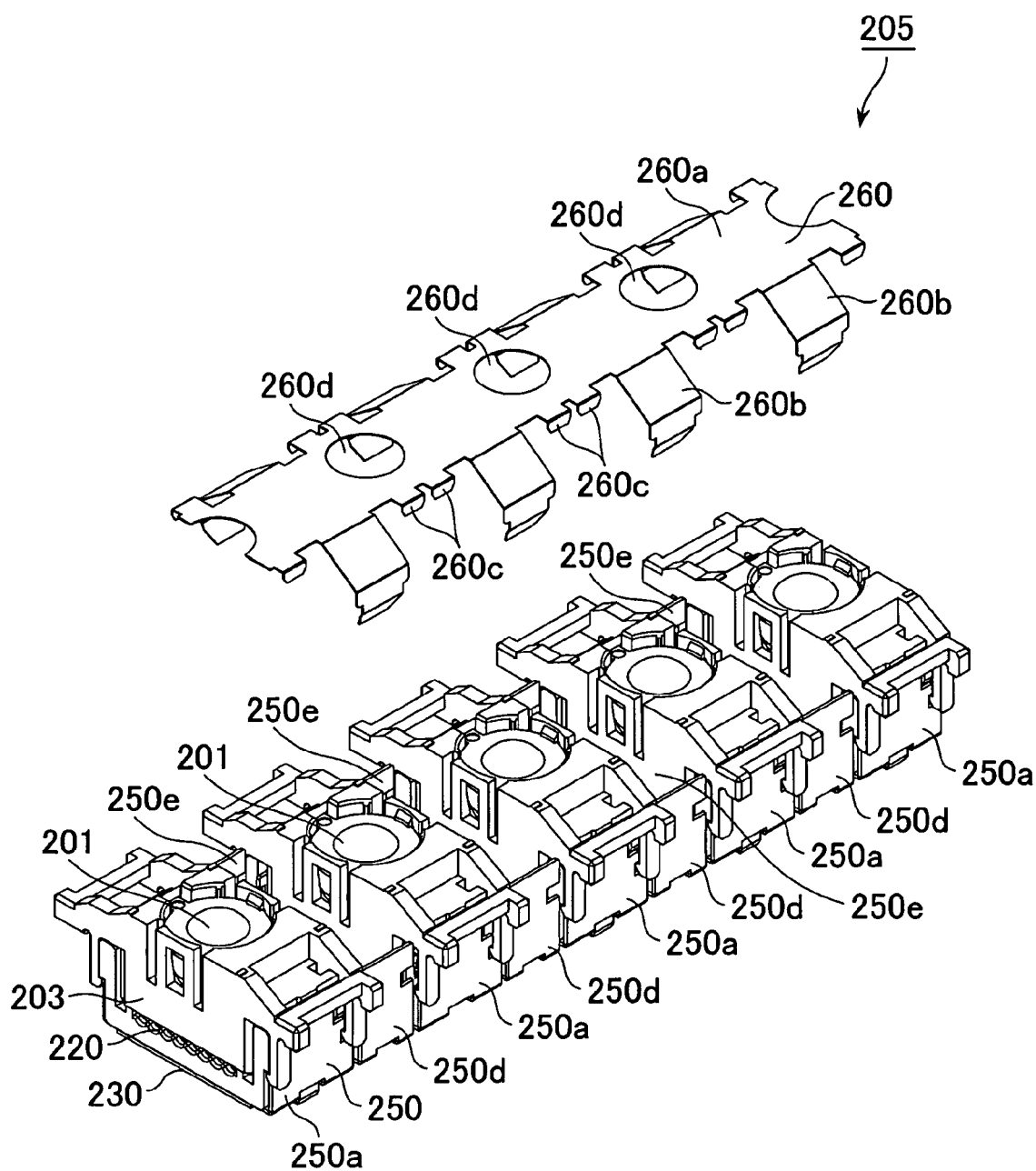
FIG. 16 shows an exploded perspective view showing the state before assembling the shield member.

As shown in FIG. 16, the feature of the multi-beam photoelectric sensor according to the invention is that a plurality of single-beam optical modules can be arranged, without any special complicated processing, at arbitrary longitudinal positions on parallel conductive members such as flat cables. This advantage, however, constitutes a disadvantage at the same time. Specifically, a space 250e is developed in the gap between the adjacent single-beam optical modules, and the parallel conductor pattern is exposed to this space 250e. Electromagnetic noises which may be generated from the case front, therefore, have a direct effect on the conductor pattern thereby causing the intrusion of noises.

In the example shown in FIG. 16, the provision of the upper surface shield member 260 closes up the gaps between the modules, thereby preventing the intrusion of noises into the parallel conductor patterns (such as the core wires of the flat cables)

As shown in FIG. 16, the upper surface shield member 260 includes a central portion 260a extending along the direction of module arrangement, and side extensions 260b, 260b extending laterally from the two side edges. Engaging hooks 260c, 260c are formed between the side extensions 260b, 260b. This upper surface shield member 260 is placed on the single-beam optical module assembly. Then, the engaging hooks 260c engage the upper surface corners of the optical part holders 203 of the single-beam optical modules, so that the positions thereof are set. At the same time, the side extensions 260b close up the spaces 250e between the modules thereby to perform the shield operation as required.

In the process, as shown in FIG. 17, the side extensions 260b have the property as a spring in such a direction as to expand in the left and right directions as indicated by arrows in FIG. 17, whereby the forward end of each side extension 250b comes into contact with the inner surface of the corresponding upright portion 250d of the support frame 250 thereby to form contact conductor portions 260e. As a result, the eddy current generated under the effect of the electromagnetic noises is saved toward the support frame 250 by the operation of the contact conductor portions 260e thereby to enhance the shield effect. As shown in FIG. 18, after assembling the shield member, the spaces between the modules are completely closed up by the side extensions 260b and the central portion 260a, although the window holes 260d secure the optical axis of the projected or received light.

As described above, in the example shown in FIGS. 16 to 18, the provision of the upper surface shield member 260 of metal (such as phosphor bronze) completely closes up the spaces 250e between the adjacent modules, and the intrusion of noises into the underlying conductor pattern (such as a flat cable) is positively shut off.

Figure 19:
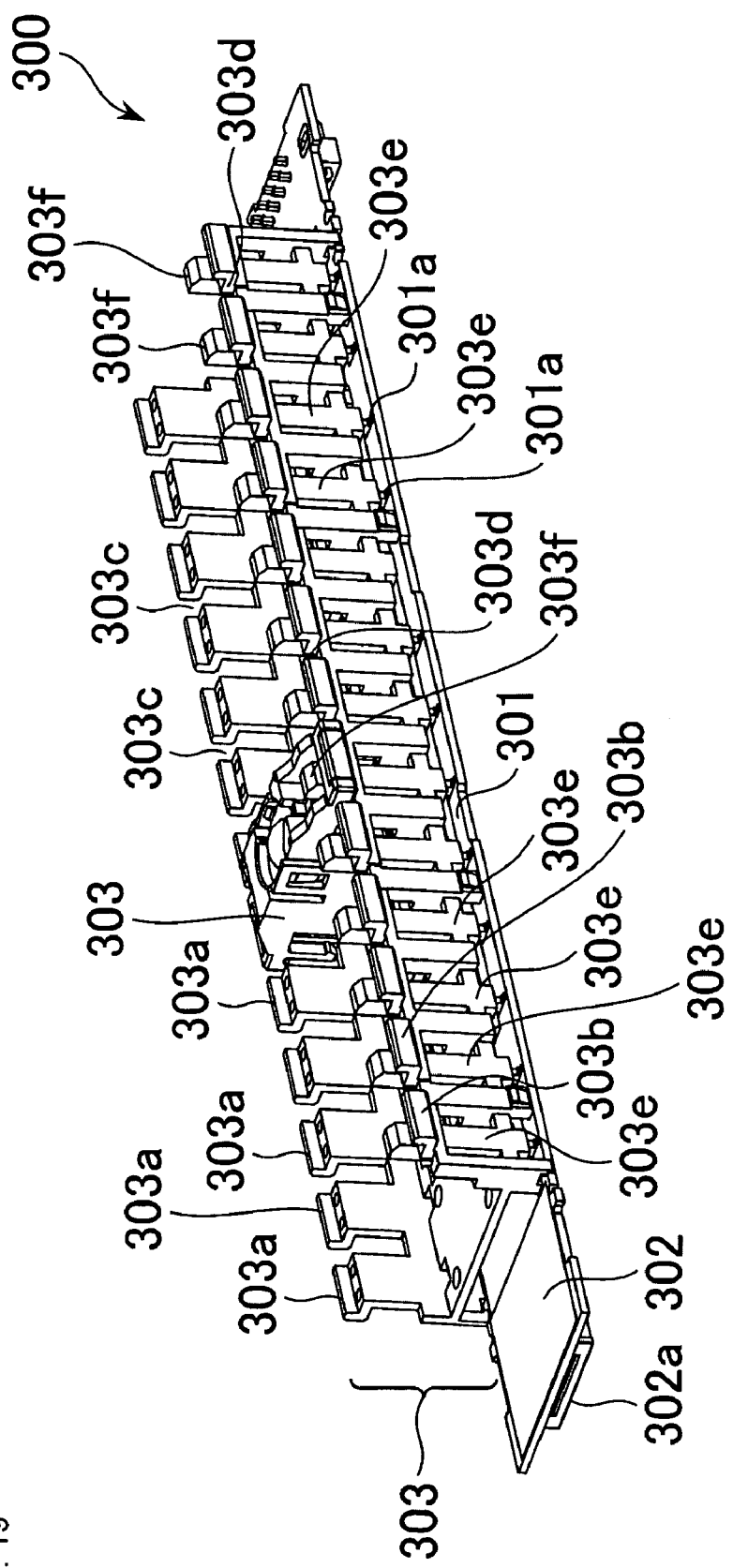
FIG. 19 shows a perspective view showing the structure of the circuit part assembly.

Next, a perspective view of the structure of the circuit part assembly is shown in FIG. 19. As shown in FIG. 19, the circuit part assembly 300 includes a CPU board 301, a connector board 302, and a board holder 303. The board holder 303 holds the CPU board 301 and the connector board 302 on the lower surface thereof, and holds the multi-beam assembly 200A on the upper surface thereof.

The circuit 40 or the circuit 50 shown in FIG. 24 is mounted on the CPU board 301. The circuit 40 of the light projection columnar member has mounted thereon a processing circuit (CPU) 41, a gate circuit 42, a display circuit 43, an input/output circuit 44 and a communication circuit 45. In similar fashion, the circuit 50 of the light-receiving columnar member has mounted therein a processing circuit (CPU) 51, an amplifier circuit 52, a display circuit 53, an input/output circuit 54 and a communication circuit 55.

The display circuits 43, 53 each have a light-emitting element for display. These light-emitting elements 301a, as shown in FIG. 19, are arranged in appropriately spaced relation with each other at one side edge of the CPU board 301. At each of the positions just above the light-emitting elements 301a, a light conductor 303e extending in vertical direction is formed integrally with the board holder 303. The forward end 303f of each light conductor 303e is exposed to the upper surface through the gap of the optical part holder 303. As a result, in spite of the provision of the light-emitting elements 301a on the board, the light emitted from them is led upward by the light conductors 303e and released outside from the forward end 303f thereof, thereby exhibiting a superior visual recognizability.

The board holder 303 has a pair of support protrusions 303a, 303b in laterally opposed relation to each other. A groove 303c is formed between each adjacent support protrusions 303a, 303b, and the corresponding portion of the optical part holder 203 is inserted into each groove 303c, so that the optical part holder 203 is fixedly positioned on the upper surface of the board holder 303. As a result, as explained above with reference to FIG. 2, a sensor assembly 10A coupled with the circuit part assembly 300 on the lower surface of the multi-beam assembly 200A is completed.

Figure 20:
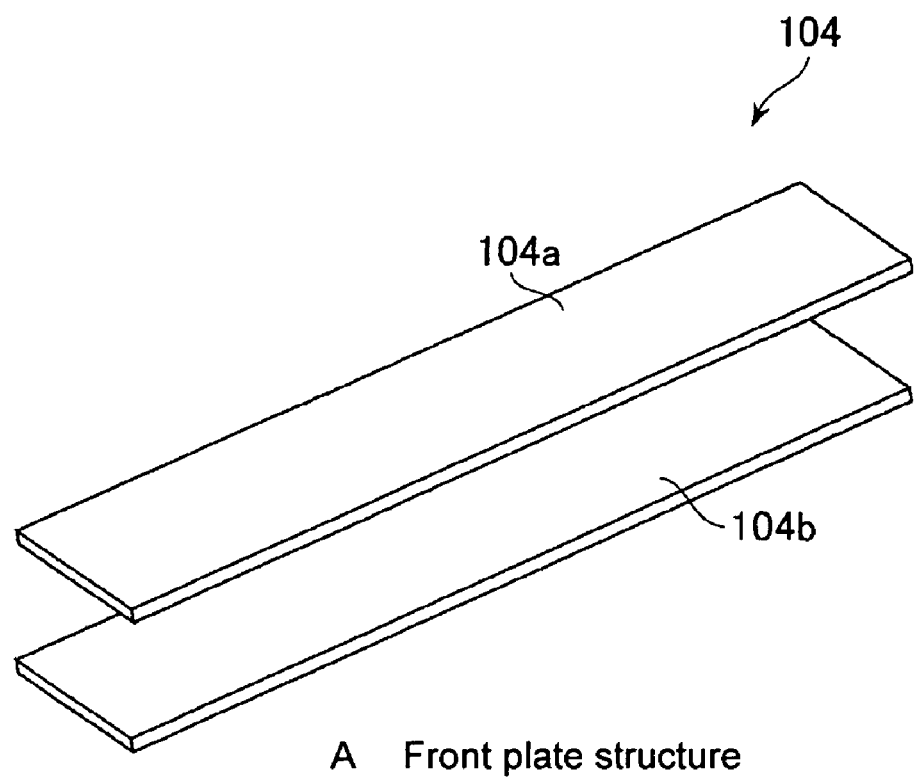
FIG. 20 shows a diagram for explaining the front seal structure of the columnar case.
Figure 20:
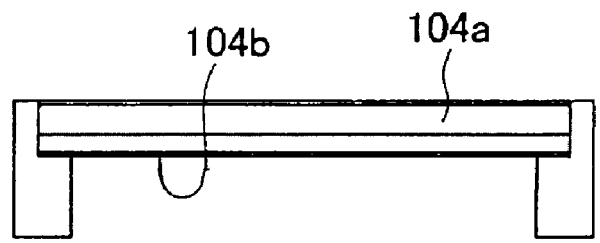

Next, a diagram for explaining the front seal structure of the columnar case is shown in FIG. 20. As shown in FIG. 20a, the front plate 104 closing the front opening of the case is formed of a light projection plate 104a of plastics or the like having a comparatively high rigidity and a photoconductive film 104b stacked on the reverse side of the light projection plate 104a. As shown in FIG. 20b, the stack structure of the light projection plate 104a and the conductive film 104b is fitted in the front opening of the columnar case body 101, and fixed by an adhesive tape or the like not shown. This arrangement of the conductive film 104b on the back of the light projection plate 104a can reduce the effect of noises on the internal parallel conductors (flat cable or the like).

Figure 21:
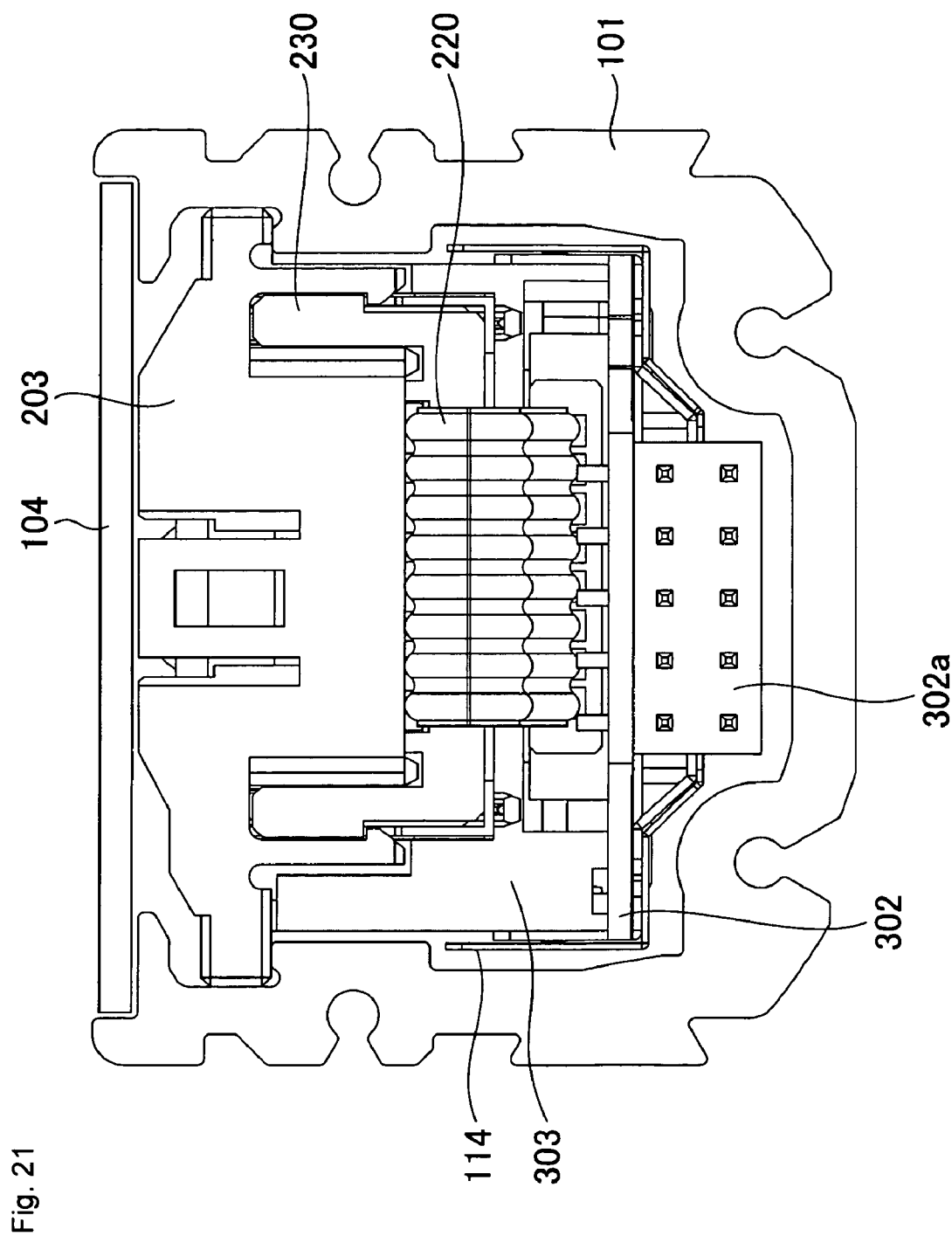
FIG. 21 shows a sectional view showing the light projection (or light-receiving) columnar member.

Next, an end surface of the light projection (or light-receiving) columnar member is shown in FIG. 21. In FIG. 21, numeral 101 designates a columnar case body, numeral 104 a front plate, numeral 114 an insulating sheet, numeral 203 an optical part holder, numeral 220 a flat cable, numeral 230 a cable holder, numeral 302 a connector board, numeral 302a a connector, and numeral 303 a board holder. These parts explained above are accommodated in the columnar case body 102 in the manner shown, and the two ends thereof are closed up by the end caps 102, 103 as explained already.

Figure 22:
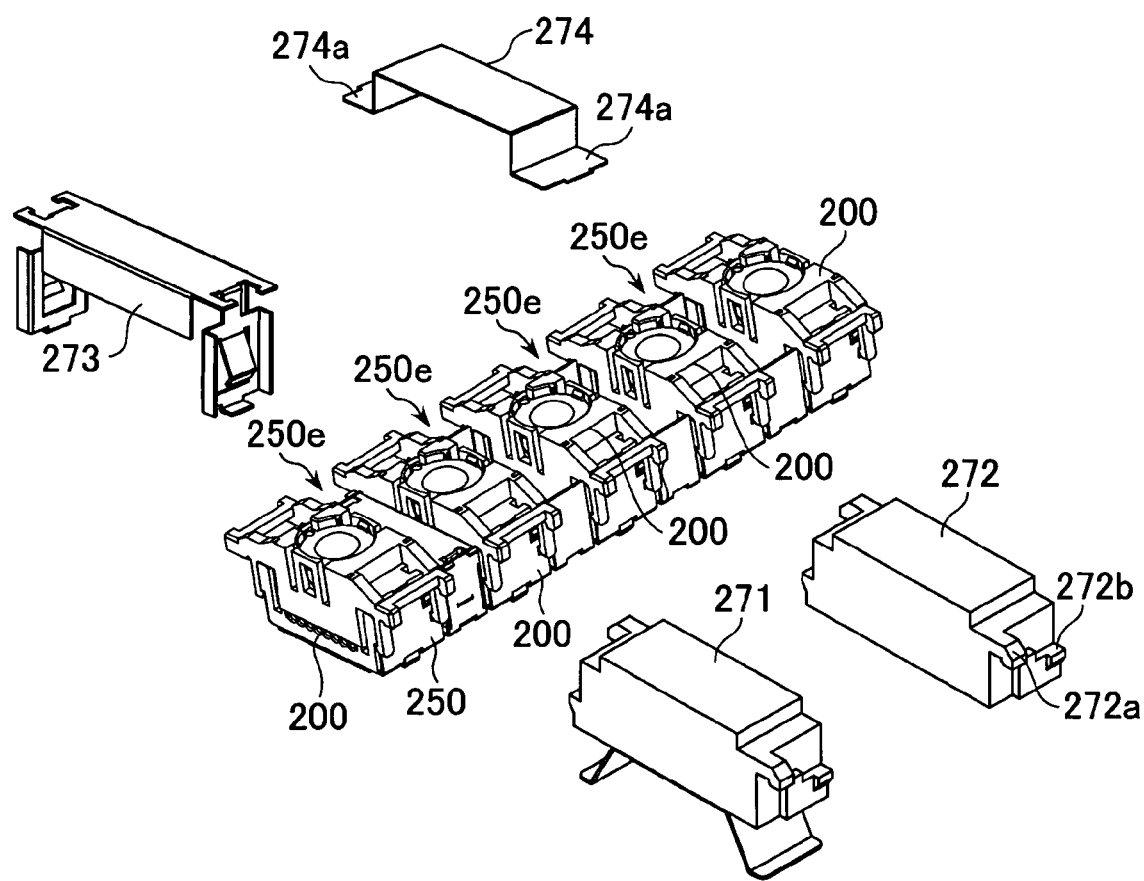
FIG. 22 shows a diagram (No. 1) for explaining a modification of the shield structure.
Figure 23:
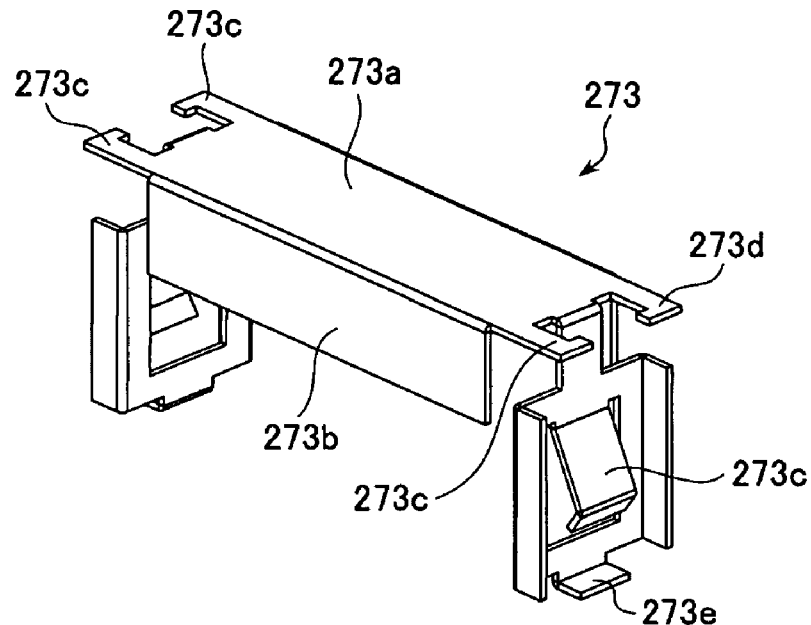
FIG. 23 shows a diagram (No. 2) for explaining a modification of the shield structure.
Figure 23:
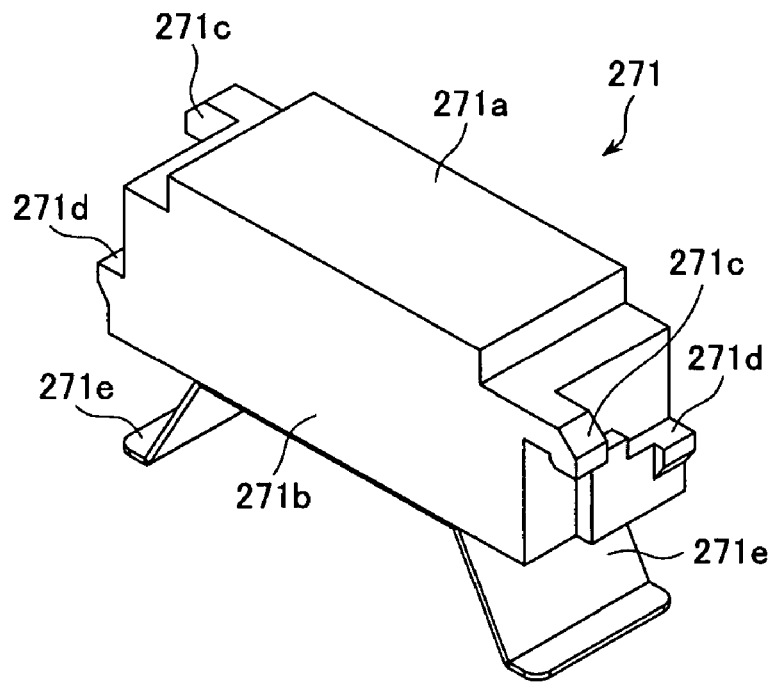

Next, a first diagram for explaining a modification of the shield structure is shown in FIG. 22, and a second diagram for explaining the same in FIG. 23. As explained above, a space 250e develops between each adjacent single-beam optical modules 200, 200, and noises are liable to intrude into the flat cable from the particular space. In the examples shown in FIGS. 16 to 18, as explained above, this space is covered with an upper surface metal shield plate 260 thereby to exhibit the shield function. In this case, however, each time the number of the optical modules connected changes, the upper surface shield plate 260 is required to be refabricated. In the example shown in FIGS. 22 and 23, in contrast, the spaces can be individually filled with a shield piece 273 or 274 or a dummy module 271 or 272. With this configuration, the spaces between the modules can be shielded without regard to the number of the modules connected, as long as the pitches between the modules are constant.

An enlarged view of the dummy module 271 is shown in FIG. 23b. As shown in FIG. 23b, the dummy module 271 has a nonconductive body and metal legs 271e, 271e having the spring property projected from the lower surface of the nonconductive body. The module body is formed of a nonconductive member having an upper surface 271a and left and right side surfaces 271b, and at the two ends thereof, four protrusions 271c, 271c, 271d, 271d are formed. The protrusions 271c, 271c are for push-down function and the protrusions 271d, 271d function as stoppers. This dummy module 217 is pushed into each inter-module space 250e. Then, the push-down protrusions 271c, 271c are brought into contact with the corresponding portions of the support frame 250, and coupled with the repulsive operation of the legs 271e, 271e, the dummy module 271 closely attaches to the support frame 250 through the legs 271e, 271e, while at the same time being fixed by the stopper steps 271d, 271d.

The shield piece 273 is shown enlarged in FIG. 23a. As shown in FIG. 23a, the shield piece 273 is configured of a thin metal material (such as phosphor bronze) and has an upper surface plate 273a and side surface plates 273b. The ends of the upper surface plate 273a are formed with left and right branches 273c, 273c, 273d, 273d, which bite into the corresponding protrusions on the support frame from the upper surface thereof so that the shield piece 273 is mounted in the corresponding space. In FIG. 23a, the bent contactor 273e has the spring property and comes into contact with the inner surface of the support frame 250 thereby to secure the electric conduction between them. Numeral 273e designates a stopper protrusion to prevent the shield piece from coming off.

Returning to FIG. 22, the dummy module 272, having a resin body of a similar structure to that of the dummy module 271, is formed of a metal film covered on the outer surface of the resin body, and similarly includes the push-down protrusions 272a and the vertical stopper protrusions 272b. Also, the shield piece 274 is a channel-shaped metal piece formed by the most simple pressing process, and has stoppers 274a.

As described above, according to this invention, the gaps or spaces 250e between the adjacent modules are closed up by the dummy modules 271, 272 or the shield pieces 273, 274, so that noises are prevented from intruding into the core wires of the flat cable from the particular gaps or spaces. In this individual mounting method, the gaps between the modules can be successfully shielded regardless of the number of optical axes simply by preparing several types of dummy modules or shield pieces in accordance with the pitches of the optical axes.

Figure 25:
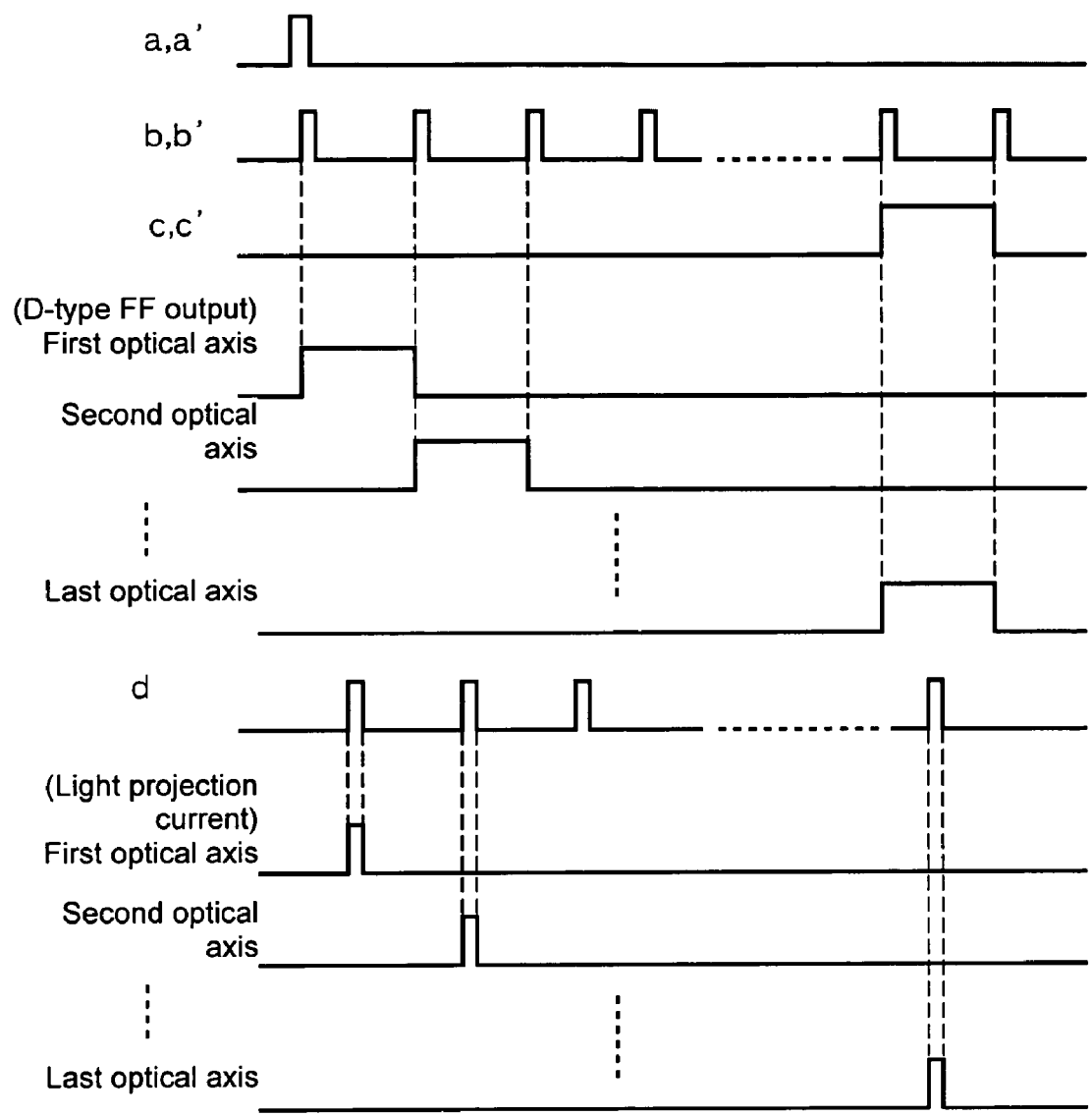
FIG. 25 shows a time chart showing the operation of the circuit as a whole.
Figure 26:
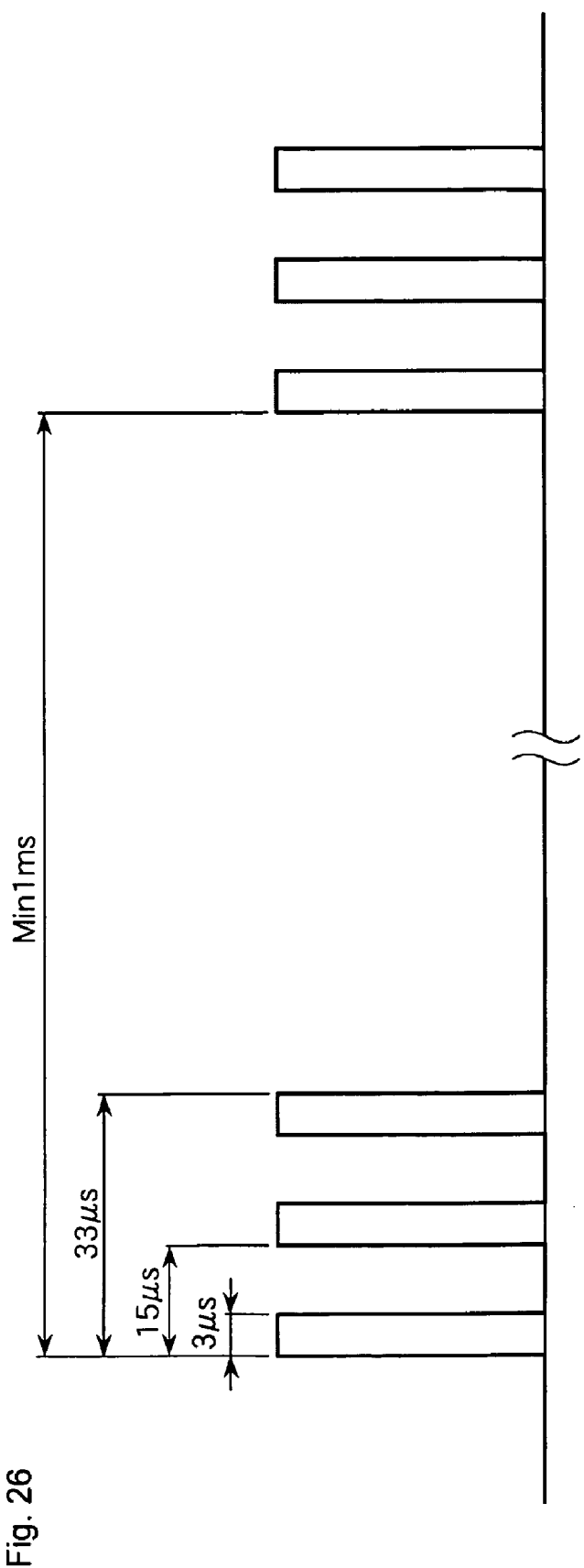
FIG. 26 shows a diagram for explaining the timing of the shift clock.

Finally, with reference to FIGS. 24 and 25, the general circuit of the multi-beam photoelectric sensor according to the invention is explained. As described above, the multi-beam photoelectric sensor according to the invention includes a circuit unit built in the light projection columnar member and a circuit unit built in the light-receiving columnar member. The light projection columnar member contains a circuit 20 corresponding to each optical axis and a circuit 40 corresponding to the CPU board. Similarly, the light-receiving columnar member contains a circuit unit 30 corresponding to each optical axis and a circuit unit 50 corresponding to the CPU board.

First, the light projection columnar member is explained. The circuit unit 20 is directly built in the single-beam optical module 200. The circuit unit 20 may be so built in or accommodated by mounting the corresponding circuit part on each circuit board piece, or a packaged optical IC 205 may be configured as shown in FIGS. 6, 7 and 9. Also, the connection structure between each single-beam optical module 200 and the flat cable or the parallel conductor flexible board can be determined in accordance with the structure of the conductor pattern.

In the case where the parallel conductor member to be connected with a given single-beam optical module is the flat cable 220 as shown in FIG. 5, the connection structure employs the pressure contact terminal pins 205a as shown in FIGS. 10 to 12. In the case where the parallel conductor member is a flexible circuit board, in contrast, a spring-type contactor or a through-hole structure connectable at an arbitrary position on the conductor pattern can be employed.

Any way, the configuration should be preferably such that each single-beam optical module can be mounted, without any special complicated process, at an arbitrary longitudinal position on the parallel conductor member. This makes it possible to mount each single-beam optical module at an arbitrary longitudinal position on the parallel conductor member, and therefore improves the freedom of setting the pitches and the number of optical axes at the same time. As for the timing of the signals a to d and the waveform in FIGS. 10 to 12, refer to the time chart of FIG. 25.

The circuit 40 mounted on the CPU board, on the other hand, includes a processing circuit (CPU) 41, a gate circuit 42, a display circuit 43 and an input/output circuit 44. Once a series of adjacent circuits 20 are connected through a parallel conductor such as a flat cable, a series of D-type flip-flops 21, 21, . . . make up a shift register. Each drive circuit 6 is activated by the Q output of the corresponding D-type flip-flop 21 output in each stage, and the light-emitting elements 23 are turned on sequentially. At the same time, the drive timing is controlled by the signal d.

Each circuit 30 of the light-receiving columnar member is accommodated in the corresponding single-beam optical module by being mounted on the small circuit board piece or as a packaged optical IC as explained above.

Each circuit 30 includes a light-receiving element 31, an amplifier circuit 32, an analog switch 33 and a D-type flip-flop 34. Also, the single-beam optical module and the parallel conductor member can be connected to each other either by a flat cable or by a flexible circuit board. As in the light projection, the adjacent single-beam optical modules are connected in a daisy chain through a conductor pattern thereby to constitute a shift register. In response to the Q output of the D-type flip-flop making up to the output of each stage, the analog gate 44 is opened, so that the output of the light-emitting element of each module is introduced into the processing circuit 51.

As explained in detail above, according to an embodiment of the invention, each single-beam optical module of the multi-beam assembly 200A is configured to accommodate not only the optical parts but also the parts of the circuits 20, 30 as well, while at the same time employing a one-touch connection structure between the optical module 200 and the parallel conductor member. Therefore, each single-beam optical module 200 can be mounted at an arbitrary longitudinal position on the parallel conductor member, thereby extremely improving the freedom of designing the pitches and the number of optical axes.

Also, the employment of the pressure contact terminal pins 205a as a terminal structure of the single-beam optical module 200 and the employment of the flat cable 220 as a corresponding parallel conductor member at the same time further facilitates the connection between them. Thus, the requirement for an arbitrary pitches and the required number of optical axes can be met in a versatile way.

In addition, the electrical circuit parts are accommodated as circuit board pieces or a packaged optical IC in the single-beam optical module 200, and therefore both the yield and productivity are successfully improved. Especially in the case where the packaged optical IC 205 is used as a circuit part, the employment of the fitting structure between the engaging holes 205f at the root of the pressure contact terminal pins 205a and the engaging protrusions 203b of the optical part holder 203 can achieve a highly accurate positioning between the optical elements 205f in the package and the optical axes of the lens members 201.

Also, the spaces generated between the adjacent single-beam optical modules arranged at arbitrary pitches on the parallel conductor member are closed by the upper surface shield member 260 or individually by the dummy modules 271, 272 or the shield pieces 273, 274. In this way, the noises from the case front are positively prevented from intruding into the parallel conductors (such as the core wires of the flat cables) exposed to the spaces.

Further, especially in the case where the flat cable is used as a parallel conductor member, as shown in FIG. 5, the punched holes 220-5a are formed at predetermined intervals in the core wire 220-5 shared by the D input and the Q output of the D-type flip-flop and thus the core wire is segmented. As a result, two different terminal pins can be mounted on the same core wire, thereby making it possible to meet the requirement of the D-type flip-flop with the same complete parallel conductor pattern. Specifically, the adjacent core wires segmented are connected alternately to the Q output of the first-stage flip-flop and the D input of the next-stage flip-flop. In this way, the requirement of the circuit configuration can be met simply by setting two terminal pins on the same line in position.

What is claimed is:

1. A multi-beam photoelectric sensor comprising: a light projection columnar member for accommodating an string of light projectors in a columnar case and a photo-detecting columnar member for accommodating a string of photo-detectors in a columnar case, wherein the light projection columnar member and the light-receiving columnar member are arranged with the light projection surface and the light-receiving surface in an appropriately spaced relation with each other thereby to generate a curtain for detecting an object between the light projection columnar member and the photo-detecting columnar member, wherein the light projector string includes:

an arrangement of a plurality of aligned light projection modules each having, integrated with each other, a light projection optical system for one optical axis, a light projection circuit for one optical axis, and a plurality of flip-flops corresponding to one stage of shift register, and a light projection signal transmission member including a common conduction wire for uniformly connecting from a light projection module located at one end of the light projection module arrangement to a light projection module located at the other end thereof and adjacent module conduction wires for connecting only adjacent light projection modules to each other;

wherein each light projection module constituting the light projection module arrangement is electrically connected to the light projection signal transmission member;

wherein the photo-detector string includes:

an arrangement of a plurality of aligned light-receiving optical modules each having, integrated with each other, a light-receiving optical system for one optical axis, a light-receiving circuit for one optical axis, and a plurality of flip-flops corresponding to one stage of shift register, and a light-receiving signal transmission member including a common conduction wire for uniformly connecting from a light-receiving module located at one end of the light-receiving module arrangement to a light-receiving module located at the other end thereof and adjacent module conduction wires for connecting only adjacent light-receiving modules to each other;

wherein each light-receiving module constituting the light-receiving module arrangement is electrically connected to the light-receiving signal transmission member;

wherein the flip-flops in the adjacent light projection modules are connected to each other in cascade by adjacent module connection wires thereby to constitute a shift register and so are the flip-flops in the adjacent light-receiving modules; and wherein the light-projection modules constituting the light-projection module arrangement and the light-receiving modules constituting the light-receiving module arrangement are sequentially activated by the data sequentially supplied from the shift register.

2. A multi-beam photoelectric sensor according to claim 1, wherein the common conduction wire and the adjacent module conduction wires of the light projection signal transmission member are integrated with each other while being kept insulated from each other.

3. A multi-beam photoelectric sensor according to claim 1, wherein the common conduction wire and the adjacent module conduction wires of the light-receiving signal transmission member are integrated with each other while being kept insulated from each other.

4. A multi-beam photoelectric sensor according to claim 1, wherein the light projection signal transmission member has a plurality of core wires, specified ones of which constitute a flat cable segmented by a plurality of punched holes and function as adjacent module connection wires for connecting only the adjacent modules to each other.

5. A multi-beam photoelectric sensor according to claim 1, wherein the light-receiving signal transmission member has a plurality of core wires, specified ones of which constitute a flat cable segmented by a plurality of punched holes and function as adjacent module connection wires for connecting only the adjacent modules to each other.

6. A multi-beam photoelectric sensor according to claim 4, wherein the light projection optical system includes a light projection element, and wherein the circuit parts corresponding the light projection element, a light projection circuit and a flip-flop are accommodated in an IC package, the lead pins of the IC package constitute pressure contact lead pins for connecting the flat cable, and the IC package can be connected under pressure on the flat cable.

7. A multi-beam photoelectric sensor according to claim 5, wherein the light-receiving optical system includes a light-receiving element, and wherein the circuit parts corresponding the light-receiving element, a light-receiving circuit and a flip-flop are accommodated in an IC package, the lead pins of the IC package constitute pressure contact lead pins for connecting the flat cable, and the IC package can be connected under pressure on the flat cable.

8. A multi-beam photoelectric sensor according to claim 6, wherein the light projection module is an integration, through an optical part holder, of a lens member constituting the light projection optical system and an IC package for accommodating an optical element with the optical axes thereof aligned, wherein the IC package includes at least a light projection element mounted on a lead frame which is the same member as the lead pins, and a positioning hole is formed at the bent portion of each lead pin, and wherein a positioning protrusion is formed at the position of the optical part holder corresponding to the positioning hole formed in the bent portion of the corresponding lead pin.

9. A multi-beam photoelectric sensor according to claim 7, wherein the light-receiving module is an integration, through an optical part holder, of a lens member constituting the light-receiving optical system and an IC package for accommodating the optical element with the optical axes thereof aligned, wherein the IC package includes at least a light-receiving element mounted on a lead frame which is the same member as the lead pins, and a positioning hole is formed at the bent portion of the corresponding lead pin, and wherein a positioning protrusion is formed at the position of the optical part holder corresponding to the positioning hole formed in the bent portion of the corresponding lead pin.

10. A multi-beam photoelectric sensor according to claim 8, wherein the positioning hole is rectangular.

11. A multi-beam photoelectric sensor according to claim 9, wherein the positioning hole is rectangular.

12. A multi-beam photoelectric sensor according to claim 1, wherein the common conduction wire constituting the light projection signal transmission member connected in common from the light projection module located at an end of the light projection module string to the light projection module located at the other end thereof includes a light projection current supply wire, a shift clock wire and a ground wire, and wherein the D input end of each flip-flop is connected to one of the adjacent module connection wires and the Q output end of the flip-flop is connected to the other end thereof.

13. A multi-beam photoelectric sensor according to claim 1, wherein the common conduction wire constituting the light-receiving signal transmission member connected in common from the light-receiving module located at an end of the light-receiving module string to the light-receiving module located at the other end thereof includes a light-receiving current supply wire, a shift clock wire and a ground wire, and wherein the D input end of each flip-flop is connected to one of the adjacent module conduction wires and the Q output end of the flip-flop is connected to the other end thereof.

* * * * *